US006718254B2

(12) United States Patent
Hashimoto et al.

(10) Patent No.: US 6,718,254 B2
(45) Date of Patent: Apr. 6, 2004

(54) INTAKE AIR QUANTITY CONTROL SYSTEM FOR INTERNAL COMBUSTION ENGINE

(75) Inventors: Kohji Hashimoto, Tokyo (JP); Katsuya Nakamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 184 days.

(21) Appl. No.: 10/040,783

(22) Filed: Jan. 9, 2002

(65) Prior Publication Data

US 2002/0193935 A1 Dec. 19, 2002

(30) Foreign Application Priority Data

Jun. 14, 2001 (JP) ........................................ 2001-180166

(51) Int. Cl.[7] .................................................. F02D 1/00
(52) U.S. Cl. ........................ 701/110; 701/114; 701/115; 123/399
(58) Field of Search ................................ 701/110, 114, 701/115, 102, 101; 123/399, 361

(56) References Cited

U.S. PATENT DOCUMENTS

| 5,447,133 A | * | 9/1995 | Kamio et al. ............... 123/399 |
| 5,546,306 A | * | 8/1996 | Hirabayashi et al. ....... 123/361 |
| 6,009,853 A | * | 1/2000 | Fujikawa et al. ........... 123/399 |
| 2003/0144778 | * | 7/2003 | Miyano ........................ 701/29 |

FOREIGN PATENT DOCUMENTS

| JP | 2-176141 A | | 7/1990 | |
| JP | 6-278502 A | | 10/1994 | |
| JP | 8-270488 A | | 10/1996 | |
| JP | 10-82340 | * | 3/1998 | .......... F02D/41/22 |
| JP | 11-2152 A | | 1/1999 | |
| JP | 11-141389 A | | 5/1999 | |
| JP | 2000-97087 A | | 4/2000 | |

* cited by examiner

Primary Examiner—Hieu T. Vo
(74) Attorney, Agent, or Firm—Sughrue, Mion, PLLC

(57) ABSTRACT

Intake air quantity control system, for internal combustion engine, ensuring improved response behaviors incorporates an abnormality supervisor and a fail-safe controller in a duplex CPU system configuration. System includes throttle valve control motor, engine driving machinery, load relay for supplying electric power to a throttle valve, peripheral auxiliary equipment, an alarm display device, main CPU for controlling the throttle valve control motor and the engine driving machinery, subsidiary CPU for controlling a load relay and the peripheral auxiliary equipment through cooperation with the main CPU, sensor groups and, serial interfaces for enabling signals to be transferred between the main CPU and the subsidiary CPU, and an abnormal event storage device for electrically deenergizing the load relay while electrically energizing the alarm display device.

14 Claims, 10 Drawing Sheets

INTAKE AIR QUANTITY CONTROL SYSTEM FOR INTERNAL COMBUSTION ENGINE

This application is based on Application No. 2001-180166, filed in Japan on Jun. 14, 2001, the contents of which are hereby incorporated by reference.

BACKGROUND OF THE INVENTION

1. Field of the Invention

The present invention generally relates to an electronic control system for controlling an intake air quantity in an internal combustion engine for a motor vehicle with a throttle valve operated by an electric motor with improved control performance while ensuring enhanced fail-safe. More particularly, the present invention is concerned with an intake air quantity control system for an internal combustion engine of the type in which a pair of central processing units or microprocessors (hereinafter referred to as the CPU in abbreviation) are employed for effectuating primary or main controls such as ignition control and fuel supply control for the internal combustion engine (hereinafter also referred to simply as the engine) with the control functions being efficiently and effectively shared between the paired CPUs for improving the control performance.

Further, the present invention is concerned with an intake air quantity control system equipped with a default position restoring mechanism which is so designed as to allow the throttle valve to be automatically restored to a position corresponding to an opening degree slightly greater than that in an idle operation upon breaking or turn-off of a load relay through which an electric power is supplied to the throttle valve control motor, wherein a backup function (fail-safe control) is adopted for coping with abnormality which may possibly occur upon restoration to the default throttle position to thereby realize the intake air quantity control with high control performance and reliability, ensuring thus improved fail-safe feature.

2. Description of Related Art

In general, the electronic throttle control for controlling the opening degree of the throttle valve through which the intake air is fed to the engine in dependence on the depression stroke or degree of an accelerator pedal is extensively adopted in practical applications. In recent years, the intake air quantity control system for the engine of wireless type in which the accelerator pedal wire is spared has been widespread.

Additionally, such intake air quantity control system for the engine has been proposed in which the accelerator pedal wire is used jointly as a backup means or in which the accelerator pedal wire is used in the ordinary driving operation whereas an electric motor is used in a constant-speed operation, e.g. a cruising operation.

On the other hand, the control for the engine system as a whole can be classified into a main control for engine driving machinery (i.e., devices or machines having direct relevancy to the operation of the engine) such as an ignition coil, a fuel injection solenoid valve and the like and an auxiliary equipment control for peripheral equipments such as an electromagnetic valve for a transmission, an electromagnetic clutch for an air-conditioner and the like. Under the circumstances, there have been proposed various types of intake air quantity control systems which differ from one another in respect to what sort of CPU configuration is to be adopted in combination with the control of the throttle valve.

For having better understanding of the concept underlying the present invention, description will first be made of the background techniques. FIG. 9 of the accompanying drawings is a block diagram showing only schematically a general arrangement of a conventional intake air quantity control system for an internal combustion engine which system is designed to perform all controls for the engine by using a single CPU 600*a*.

Referring to FIG. 9, output signals 610*a* of various sensors indicating operation states of the engine are inputted to the CPU 600*a*. As the various sensor output signals 610*a*, there may be mentioned such on/off signals and analogue signals which are derived, respectively, from the outputs of an engine rotation speed detecting sensor, a crank angle sensor, an air flow sensor for measuring the intake air quantity (i.e., flow rate of the intake air), an intake pressure sensor, an exhaust gas sensor, a water temperature sensor, an accelerator pedal position sensor (hereinafter also referred to as the APS in abbreviation) for measuring the degree of depression of an accelerator pedal, a throttle position sensor (hereinafter also referred to as the TPS in short) for measuring or detecting the opening degree of a throttle valve, a shift position sensor for detecting a position of a speed shift lever and others.

The CPU 600*a* is so designed or programmed as to output control signals 620*a* and 621*a* for various types of actuators which the engine is equipped with. The control signal 620*a* is destined for controlling operations of primary or main machinery such as an ignition coil, a fuel injection solenoid valve, a speed stage shifting solenoid valve and an exhaust gas recirculation (EGR) controlling solenoid valve as well as auxiliary equipments such as an air-conditioner and the like. On the other hand, the control signal 621*a* is destined for the control of a throttle valve control motor or the like.

Incidentally, the conventional system known heretofore for performing all the controls with the single CPU 600*a*, as shown in FIG. 9, is disclosed in, for example, Japanese Patent Application Laid-Open Publications Nos. 176141/1990 (JP-A-2-176141) and 141389/1999 (JP-A-11-141389).

However, the conventional systems such as mentioned above suffers a serious problem that an excessively heavy burden is imposed on the CPU 600*a* for realizing satisfactorily the desired engine performance as well as the specified functions and that adequate fail-safe function can not always be ensured for coping with abnormal events occurring in the engine system.

As is well known in the art, so long as the intake air quantity can be controlled with high reliability, there will arise no fear of runaway of the engine. Accordingly, the control of the intake air quantity (i.e., control of flow rate of the intake air) is one of the most important factors for ensuring the safety for operation of the engine. Under the circumstances, it is desirable to provide the relevant sensors and the CPUs in a duplexed arrangement (redundant arrangement) especially for the electronic control of the throttle valve.

FIG. 10 is a block diagram showing schematically a first conventional intake air quantity control system for an internal combustion engine which system is implemented in a triplex CPU configuration in which three CPUs 600*b*, 601*b* and 602*b* are employed for the control purpose.

Referring to FIG. 10, inputted to the CPU 600*b* are various sensor signals 610*b* relevant to the main machinery (and auxiliary equipments) from the engine speed detecting sensor, the crank angle sensor, the air flow sensor, the intake pressure sensor and the like. The CPU 600*b* is so programmed as to generate control signals 620*b* for the main machinery (and the auxiliary equipment) on the basis of the input sensor signals.

On the other hand, inputted to the CPU 601b are sensor signals 611b for the throttle control from the accelerator pedal position sensor (APS), the throttle position sensor (TPS) and the like. In response to these sensor signals, the CPU 601b outputs a control signal 621b for the throttle valve control motor.

Furthermore, a sensor signal 612b for supervisory control is inputted to the CPU 602b which is so programmed as to output a control signal 622b destined for the supervisory control of a load relay, an electromagnetic clutch and others with the aim of ensuring high fail-safe or security for the electronic control of the throttle valve.

The conventional system in which a plurality of CPUs are employed as in the case of the system shown in FIG. 10 is disclosed in e.g. Japanese Patent Application Laid-Open Publications Nos. 278502/1994 (JP-A-6-278502) and 2152/1999 (JP-A-11-2152).

In these publications, no specific description is found concerning the CPU 600b. It can however be understood that the CPU 601b serves as the main CPU with the CPU 602b serving as the subsidiary CPU dedicated solely for the control of the throttle valve.

The system disclosed in the publications mentioned just above is realized as a combination of the engine control apparatus of accelerator pedal wire type and an additional constant-speed control apparatus by employing three CPUS, which involves consequently high complexity and expensiveness in the system configuration.

FIG. 11 is a block diagram showing schematically a third conventional intake air quantity control system for an internal combustion engine which system includes a pair of CPUs 600c and 601c for the control of the intake air quantity.

Referring to FIG. 11, various sensor signals 610c relevant to the main machinery (and auxiliary equipments) are inputted to the CPU 600c which is programmed to output control signals 620c destined for the main machinery (and the auxiliary equipments).

On the other hand, inputted to the CPU 601c are the sensor signals for the throttle control (and sensor signals for the supervisory control or function) 611c, wherein the CPU 601c is programmed to output a control signal 621c for the throttle valve control motor (and a control signal for the supervisory control or function). Further, the CPUs 600c and 601c are designed to perform mutual monitor functions.

In the CPU configuration shown in FIG. 11, the CPU 600c serves as an engine control unit (ECU in abbreviation) with the CPU 601c serving as a throttle control unit (TCU in short). Thus, the whole system can ensure improved or enhanced security or fail-safe feature by virtue of the mutual monitoring feature.

The system in which a pair of CPUs are employed, as shown in FIG. 11, is disclosed in the Japanese Patent Application Laid-Open Publications Nos. 270488/1996 (JP-A-8-270488) and 97087/2000 (JP-A12-97087). More specifically, a system in which the accelerator pedal wire is employed in combination is disclosed in Japanese Patent Application Laid-Open Publication No. 270488/1996, while a system of wireless implementation type is disclosed in Japanese Patent Application Laid-Open Publication No. 97087/2000.

In both the systems disclosed in the above-mentioned publications, description is found concerning a fail-safe control means for enabling smoothly a so-called limp-home driving (siding operation or go-home operation) upon occurrence of abnormal event(s).

Among the first to third conventional systems mentioned above by reference to FIGS. 9 to 11, the system in which the single CPU 600a is employed as in the case of the system shown in FIG. 9 suffers problems in respect to the security (fail-safe function) and large burden imposed on the CPU 600a for realizing the intended control.

The problems mentioned above can certainly be disposed of by sharing the control functions between or among a plurality of CPUs while allowing mutual surveillance to be effectuated, as mentioned above by reference to FIGS. 10 and 11. However, in view of the fact that the engine drive controls (e.g. ignition control and fuel injection control) and the throttle control bear very intimate relevancy to each other, it is not expedient to share these controls between or among the individual CPUs.

In this conjunction, it is that the various sensor signals inputted to the CPUs contain many sensor signals used in common for the individual controls such as the engine drive control, the throttle valve control and the auxiliary equipment control in addition to the sensor signals destined discretely for these controls, respectively.

Accordingly, inputting directly these common sensor signals individually to each of the CPUs will wastefully incur increase in the number of input ports, to a disadvantage.

As is apparent from the foregoing, the conventional intake air quantity control system for the engine can not evade the problem that difficulty is encountered in ensuring the security (fail-safe) while a heavy burden is imposed on the CPU in performing the intended controls in the case where the single CPU is resorted to.

On the other hand, in the system where a plurality of CPUs 600b to 602b (see FIG. 10) are employed, the engine drive control and the throttle valve control which bear close relevancy to each other are shared by the CPUs 600b and 601b. As a consequence, a large number of input ports are wastefully required, giving rise to the problem of inexpediency.

Similarly, in the system shown in FIG. 11 where a plurality of CPUs 600c and 601c are used, the engine drive control and the throttle valve control are shared discretely by the CPUs 600c and 601c, respectively, incurring a problem that the number of the input ports increases wastefully.

SUMMARY OF THE INVENTION

In the light of the state of the art described above, it is an object of the present invention to provide an intake air quantity control system for an internal combustion engine which system includes a pair of so-called main and subsidiary CPUs arranged to share control functions therebetween in such a manner that an engine drive control (main machinery control) and a throttle control are performed by a main CPU while a supervisory control is performed by a subsidiary CPU and in which an abnormality supervising means and a fail-safe control means suited for a novel CPU configuration are incorporated, to thereby ensure significantly enhanced control performance as well as improved fail-safe or security feature.

Another object of the present invention is to provide an intake air quantity control system for an internal combustion engine equipped with a default position restoring mechanism which is so designed as to allow a throttle valve to automatically restore a position corresponding to an opening degree slightly greater than that in an idle operation upon breaking or turn-off of a load relay through which an electric power is supplied to the throttle valve control motor, wherein a backup function (fail-safe control) is ensured for coping with abnormal event(s) possibly occurring upon restoration to the default throttle position to thereby realize the intake air quantity control which can enjoy high performance and security or fail-safe feature.

In view of the above and other objects which will become apparent as the description proceeds, there is provided according to a first general aspect of the present invention an intake air quantity control system for an internal combustion engine, which system includes a throttle valve control motor for controlling an opening degree of a throttle valve for thereby adjustably regulating a quantity of intake air supplied to the internal combustion engine in dependence on a depression degree of an accelerator pedal, an engine driving machinery including an fuel injection solenoid valve of the internal combustion engine, a load relay through which an electric power is supplied to the throttle valve control motor, peripheral auxiliary equipments of the internal combustion engine, an alarm display device, a main CPU for supplying a first control signal to the throttle valve control motor and second control signals to the engine driving machinery, a subsidiary CPU for supplying a load relay driving signal to the load relay and third control signals to the peripheral auxiliary equipments through cooperation with the main CPU, a first group of on/off sensors for supplying to the main CPU a first group of on/off signals for high-speed/high-frequency operations having relevancy to the first and second control signals, a first group of analogue sensors for supplying a first group of analogue signals to the main CPU, a second group of on/off sensors for supplying to the subsidiary CPU a second group of on/off signals for low-speed/low-frequency operations having relevancy to at least one of the first, second and third control signals, a second group of analogue sensors for supplying a second group of analogue signals to the subsidiary CPU, a serial interface means for enabling signals to be transferred between the main CPU and the subsidiary CPU, an abnormal event storing device for storing detection of an abnormal event to thereby electrically deenergize the load relay while electrically energizing the alarm display device, a power switch for supplying an electric power to at least one of the main CPU and the subsidiary CPU, and a power supply detecting means operative in response to closing or opening of the power switch, wherein the abnormal event storing device is reset by the power supply detecting means.

By virtue of the arrangement of the intake air quantity control system described above, transaction or transfer of the control signals having mutual relevancy or correlated can be facilitated, whereby abnormality supervising means and fail-safe control means suited for the novel CPU configuration can be realized for ensuring enhanced control/response performances. Further, since the subsidiary CPU contributes to reduction of the number of input/output ports of the main CPU and the burden imposed on the main CPU which is in charge of supervising or monitoring unitarily and uniformly high-speed operations, the system can be implemented in the form of a small-size integrated circuit which can nevertheless ensure high safety or fail-safe. More specifically, since such arrangement can be adopted that a large number of input/output signals are caused to pass through the subsidiary CPU, the subsidiary CPU is in the position to supervise the signals for the auxiliary machinery controls inclusive of the throttle valve control. Thus, the burden imposed on the main CPU can effectively be reduced while high security can be ensured for the engine system as a whole. Furthermore, because a large number of signals are transferred between the main CPU and the subsidiary CPU via the serial interfaces, the number of input/output terminals of the main CPU can remarkably be decreased, which in turn means that the intake air quantity control system can be implemented as a small IC chip while allowing logic circuits to be added for further improving the functions and performance of the main CPU when occasion requires.

In a preferred mode for carrying out the invention, the first group of analogue sensors may include a first accelerator pedal position sensor for detecting the depression degree of the accelerator pedal, and a first throttle position sensor for detecting the opening degree of the throttle valve. Similarly, the second group of analogue sensors may include a second accelerator pedal position sensor for detecting the depression degree of the accelerator pedal, and a second throttle position sensor for detecting the opening degree of the throttle valve. In that case, signals indicative of the depression degree of the accelerator pedal and the opening degree of the throttle valve may be respectively inputted to the main CPU and the subsidiary CPU.

Owing to the arrangement described above, the main CPU 111 can perform the throttle valve control by itself, the state of which can be monitored or supervised by the subsidiary CPU by itself. Besides, owing to duplex or duplicate arrangement of the analogue sensors, the intake air quantity control system ensuring the further enhanced fail-safe feature can be realized.

In another preferred mode for carrying out the invention, the intake air quantity control system for the internal combustion engine may further include a wire-breakage/short-circuit detecting means for detecting occurrence of wire-breakage/short-circuit abnormality in the throttle valve control motor to thereby generate a wire-breakage/short-circuit abnormality detection signal, and a watchdog timer circuit for monitoring runaway of the main CPU on the basis of a watchdog signal generated by the main CPU. In that case, the watchdog timer circuit may be so designed as to generate a first reset signal for reactivating the main CPU upon occurrence of abnormality in the watchdog signal generated by the main CPU. On the other hand, the main CPU may be so designed as to generate a second reset signal for reactivating the subsidiary CPU upon occurrence of abnormality in a watchdog signal generated by the subsidiary CPU. In that case, the abnormal event storage device can be set in response to the wire-breakage/short-circuit abnormality detection signal and the first and second reset signals.

With the arrangement described above, when a malfunction temporarily occurs in the CPUs due to noise or the like, a normal state can immediately be restored. Thus, the ignition control and the fuel injection control can normally be carried out substantially continuously. Besides, upon occurrence of runaway of the CPU operation due to noise or the like disturbance, the throttle valve control which plays an essential role in securing the safety for the running operation of a motor vehicle can be stopped while allowing the throttle valve control to be restored upon closing of the power switch. Thus, security can be ensured for the driving of the motor vehicle. Moreover, a message indicative of occurrence of abnormal or erroneous operation can be issued to operator or driver of the motor vehicle.

In yet another preferred mode for carrying out the invention, the intake air quantity control system for the internal combustion engine may further include a first sensor abnormality detecting means for generating a first sensor abnormality detection signal in response to occurrence of the wire-breakage/short-circuit abnormality of the first and second accelerator pedal position sensors and relative output abnormality thereof, and a second sensor abnormality detecting means for generating a second sensor abnormality detection signal in response to occurrence of the wire-breakage/short-circuit abnormality of the first and second throttle position sensors and relative output abnormality thereof, wherein the abnormal event storage device is set in response to the first and second abnormality detection signals.

With the arrangement described above, safety can be ensured by detecting positively the fail abnormality of the sensors relating to the throttle valve control and stopping the throttle valve control which bears great relevancy to the safety of running operation of the motor vehicle. Besides, the operator or the driver can immediately recognize occurrence of the abnormality.

In still another preferred mode for carrying out the invention, at least one of the first and second groups of analogue sensors may include a throttle position sensor for detecting the opening degree of the throttle valve. The main CPU may be so designed as to arithmetically determine a first target throttle opening degree as a target value for the opening degree of the throttle valve while the subsidiary CPU may be so designed as to arithmetically determine a second target throttle opening degree as a target value for the opening degree of the throttle valve, wherein the subsidiary CPU may include an earlier-half control abnormality detecting means for deciding validity of the first target throttle opening degree through comparison of a signal indicative of the first target throttle opening degree with a signal indicative of the second target throttle opening degree, and a latter-half control abnormality detecting means for deciding the validity of the first target throttle opening degree through comparison of the signal indicative of the first target throttle opening degree with a detection signal outputted from the second throttle position sensor and inputted to the subsidiary CPU. In that case, the abnormal event storage device can be set in response to an earlier-half abnormality detection signal generated by the earlier-half control abnormality detecting means and a latter-half abnormality detection signal generated by the latter-half control abnormality detecting means.

With the arrangement described above, abnormal operations of the CPUs, abnormality of the sensors bearing important relevancy to the throttle valve control and abnormality of the throttle valve control motor can be checked synthetically and duplicatively (i.e., during the earlier-half and latter-half periods, respectively), whereby the throttle valve control playing an essential role in securing the safety can be stopped upon detection of the abnormality. Of course, such abnormality can immediately be informed to the operator or driver.

In a further preferred mode for carrying out the invention, at least one of the first and second groups of analogue sensors includes a throttle position sensor for detecting the opening degree of the throttle valve. In that case, the intake air quantity control system may further include a brake switch for detecting a depressed state of a brake pedal to thereby generate a brake application detecting signal, a default position restoring mechanism for causing the throttle valve to be automatically restored to a position at which the opening degree of the throttle valve is slightly greater than that in an idle operation mode of the internal combustion engine, when the power supply to the throttle valve control motor is interrupted, an engine rotation repressing means for adjustably regulating a fuel quantity supplied through the fuel injection solenoid valve in response to deviation of an actual rotation speed of the internal combustion engine from a predetermined threshold value of the rotation speed of the engine upon electrical deenergization of the load relay, a default restoration confirming means responsive to a detection signal of the throttle position sensor for deciding whether the opening degree of the throttle valve is restored to a predetermined position to thereby generate a default restoration signal, an ordinary threshold value setting means for setting an ordinary threshold value on the basis of the default restoration signal and the brake application detecting signal when the default position is restored or alternatively when the brake is inoperative, and a minimum threshold value setting means for setting a minimum threshold value on the basis of the default restoration signal and the brake application detecting signal when the opening degree of the throttle valve is large in the state restored to the default position and when the brake switch is operative, wherein the predetermined threshold value is variably set by the ordinary threshold value setting means and the minimum threshold value setting means in response to the default restoration signal and the brake application detecting signal.

With the arrangement described above, the throttle valve is caused to restore the default position when the load relay is electrically deenergized in response to occurrence of abnormality. Thus, the siding operation can be performed with safety solely by applying the brake. Additionally, in the case where the throttle valve is locked at the position corresponding to a very large opening degree because of a mechanical abnormality (machine malfunction), the motor vehicle can be stopped without any difficulty or alternatively the siding operation thereof can easily be carried out.

According to a second general aspect of the invention, there is provided an intake air quantity control system for an internal combustion engine which comprises an intake air quantity control system for an internal combustion engine includes a throttle valve control motor for controlling an opening degree of a throttle valve for thereby adjustably regulating a quantity of intake air supplied to the internal combustion engine in dependence on a depression degree of an accelerator pedal, a load relay for supplying an electric power to the throttle valve control motor, an accelerator pedal position sensor for detecting the depression degree of the accelerator pedal, a throttle position sensor for detecting the opening degree of the throttle valve, a brake switch for detecting a depressed state of a brake pedal to thereby generate a brake application detecting signal, a default position restoring mechanism for causing the throttle valve to be automatically restored to a position at which the opening degree of the throttle valve is slightly greater than that in an idle operation mode of the internal combustion engine, when the power supply to the throttle valve control motor is interrupted, an engine rotation repressing means for adjustably regulating a fuel quantity supplied through the fuel injection solenoid valve in response to deviation of an actual rotation speed of the internal combustion engine from a predetermined threshold value of the rotation speed of the engine upon deenergization of the load relay, a default restoration confirming means responsive to a detection signal of the throttle position sensor for deciding whether the opening degree of the throttle valve is restored to a predetermined position to thereby generate a default restoration signal, an ordinary threshold value setting means for setting an ordinary threshold value on the basis of the default restoration signal and the brake application detecting signal when the default position is restored or alternatively when the brake is inoperative, and a minimum threshold value setting means for setting a minimum threshold value on the basis of the default restoration signal and the brake application detecting signal when the opening degree of the throttle valve is large in the state restored to the default position and when the brake switch is operative, wherein the predetermined threshold value is variably set by the ordinary threshold value setting means and the minimum threshold value setting means in response to the default restoration signal and the brake application detecting signal.

With the arrangement described above, the throttle valve is caused to restore the default position when the load relay is electrically deenergized in response to occurrence of abnormality. Thus, the siding operation can be performed with safety solely by applying the brake. Besides, in the case where the throttle valve is locked at the position corresponding to a very large opening degree because of a mechanical abnormality, the motor vehicle can be stopped without any difficulty. Alternatively, the siding operation thereof can be carried out.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings. Also in the following description, it is to be understood that such terms as "main", "subsidiary" and the like are words of convenience and are not to be construed as limiting terms.

Embodiment 1

In the following, description will be made in detail of the intake air quantity control system for an internal combustion engine according to a first embodiment of the present invention by reference to FIGS. 1 to 6.

Figure 1:
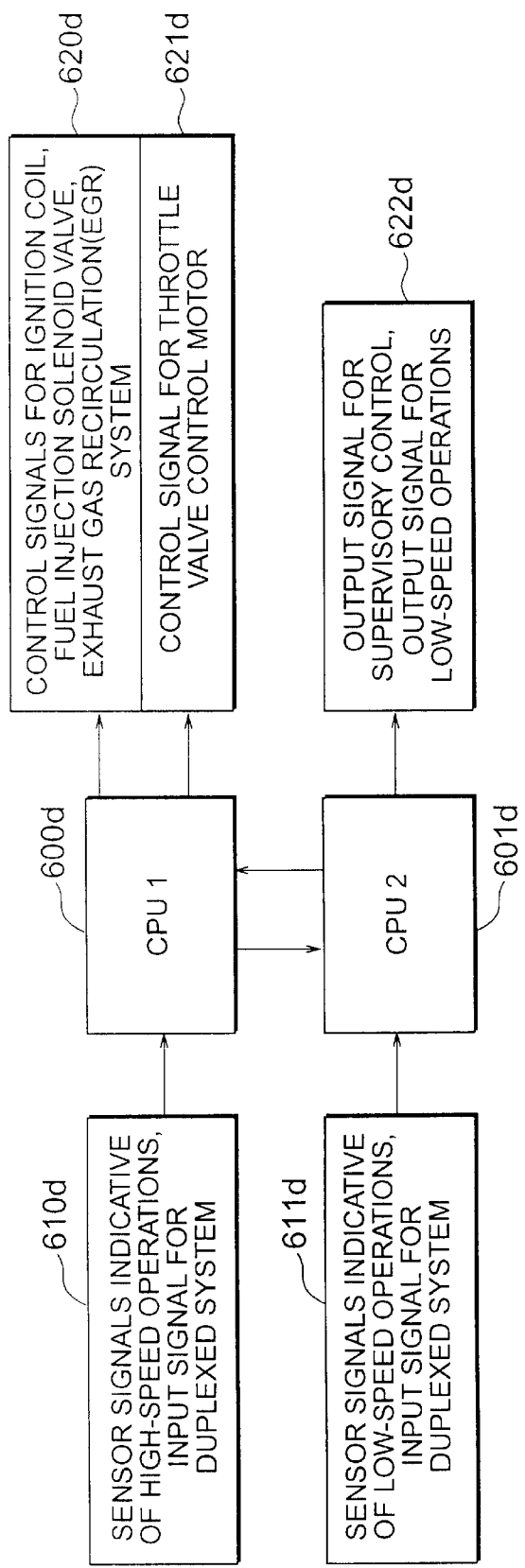
FIG. 1 is a block diagram showing schematically a general arrangement of an intake air quantity control system for an internal combustion engine according to a first embodiment of the present invention.
Figure 9:
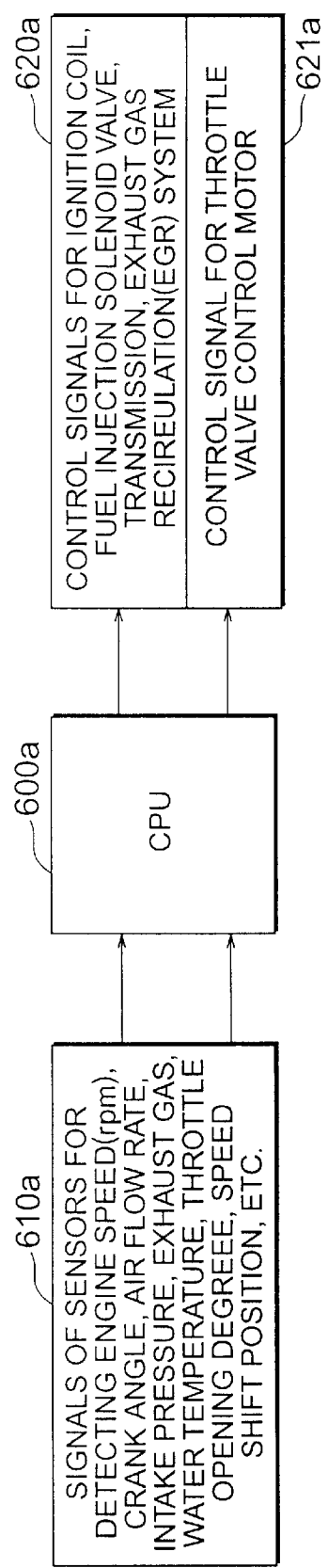
FIG. 9 is a block diagram showing schematically a general arrangement of a first conventional intake air quantity control system for an internal combustion engine.
Figure 10:
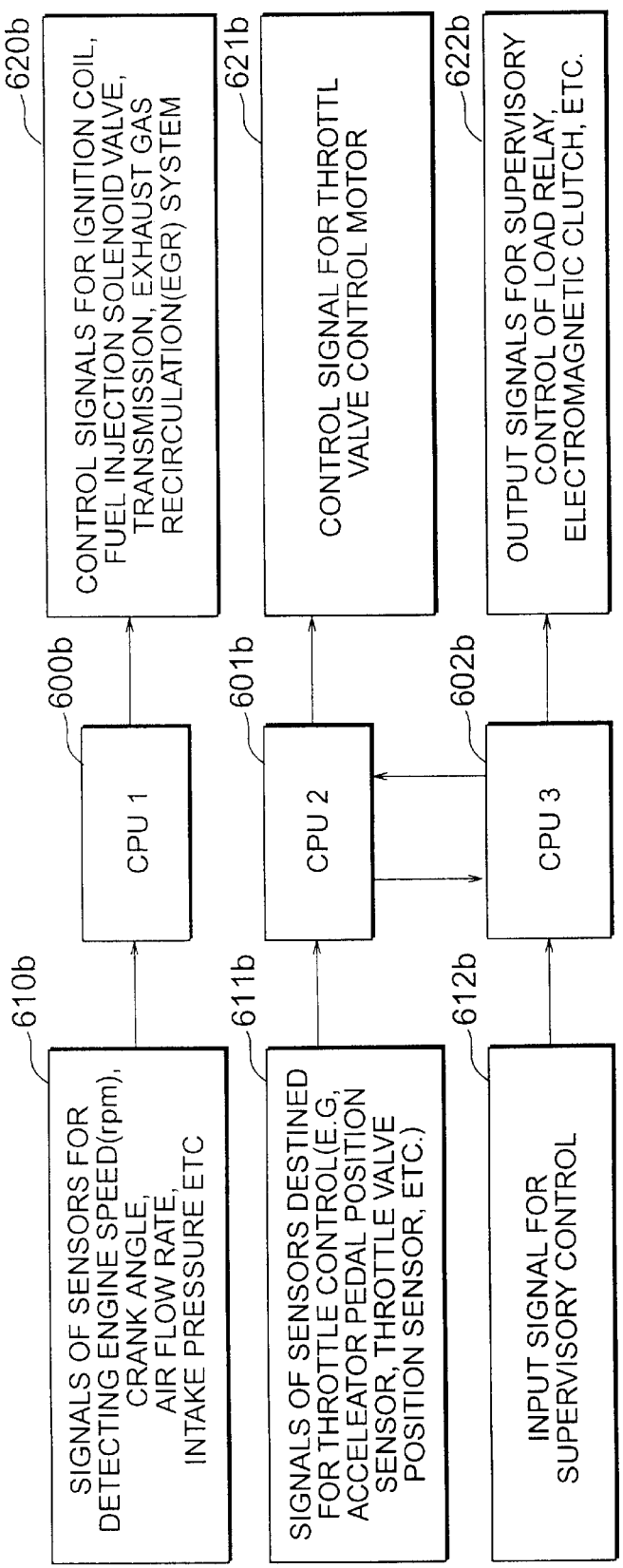
FIG. 10 is a block diagram showing schematically a general arrangement of a second conventional intake air quantity control system for an internal combustion engine.
Figure 11:
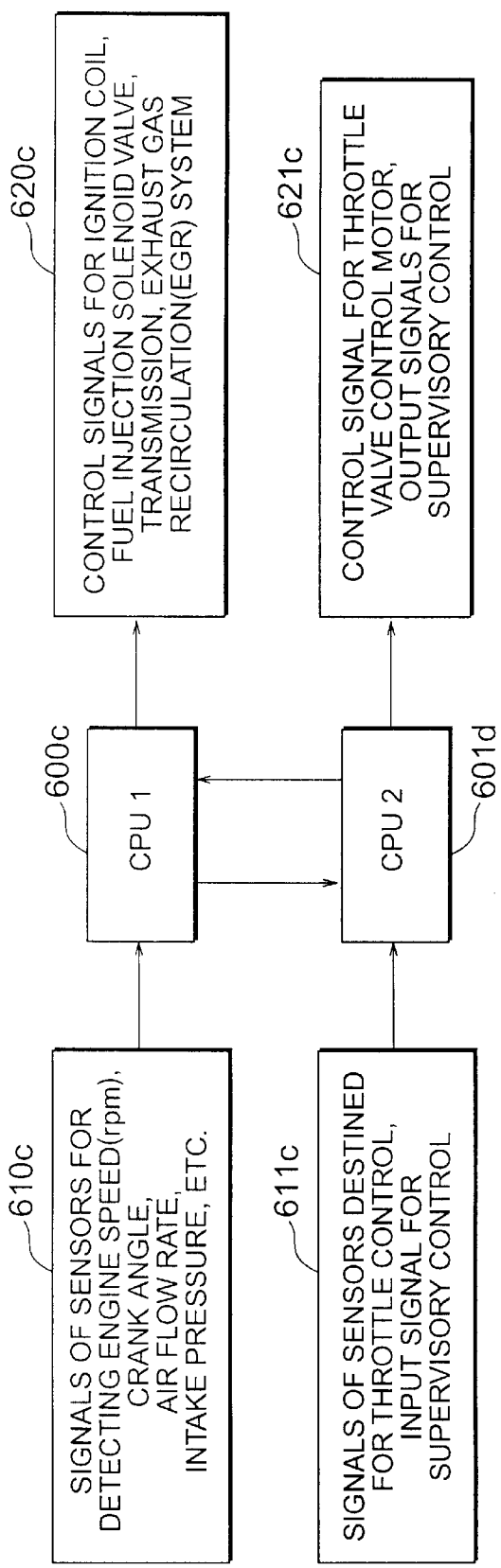
FIG. 11 is a block diagram showing schematically a general arrangement of a third conventional intake air quantity control system for an internal combustion engine.

FIG. 1 shows only schematically a general arrangement of the intake air quantity control system according to the first embodiment of the invention in a block diagram similar to those of the conventional intake air quantity control systems (FIGS. 9 to 11) for facilitating comparison with the latter.

Referring to FIG. 1, the intake air quantity control system according to the instant embodiment of the invention includes a pair of juxtaposed CPUs, i.e., a CPU 1 designated by 600$d$ and a CPU 2 designated by 601$d$. For the convenience of description, the CPU 1 600$d$ will be referred to as the main CPU with the CPU 2 601$d$ being termed the subsidiary CPU.

The subsidiary CPU 601$d$ is designed to issue control signals for a load relay and peripheral auxiliary devices or equipments through cooperation with the main CPU 600$d$.

The main CPU 600$d$ is straightforwardly supplied with various sensor output signals indicative of high-speed/high-frequency operations from an engine rotation speed detecting sensor, a crank angle sensor and the like together with a duplex-system input signal prepared for ensuring the fail-safe feature, as designated generally by a reference symbol 610$d$. Concerning the duplex-system input signal, description in detail will be made later on.

On the basis of the sensor signals, the main CPU 600$d$ issues control signals 620$d$ for engine driving units or machinery (main machinery) such as an ignition coil, a fuel injection solenoid valve and the like and additionally a control signal 621$d$ for a throttle valve control motor, to thereby control the engine driving machinery and the throttle valve control motor in a unitary manner.

On the other hand, the subsidiary CPU 601$d$ is straightforwardly supplied with the sensor output signals from all the sensors designed for monitoring low-speed/low-frequency operations and the duplex-system input signal, as generally designated by a reference symbol 611$d$.

The subsidiary CPU 601$d$ (CPU 2) performs processings such as A/D conversion (analogue-to-digital conversion) for a large number of analogue signals contained in the sensor signals 611$d$ as well as chattering elimination processing on on/off signals in addition to the processing for detecting wire breakage for the various types of sensors. The results of these processings executed by the subsidiary CPU 601$d$ are sent to the main CPU 600$d$ (CPU 1) through the medium of a serial interface described hereinafter.

The control for the peripheral auxiliary equipments such as the air-conditioner and the like (described hereinafter) is primarily executed by the main CPU 600$d$ (CPU 1). In this conjunction, it is however to be mentioned that the control signals for the peripheral auxiliary equipments or machinery are also sent to the subsidiary CPU 601$d$ (CPU 2) via the serial interface to be outputted from the subsidiary CPU 601$d$ (CPU 2) as low-speed operation control signals and the supervisory control signal, as generally designated by reference symbol 622$d$.

As will be described later on, control functions to be executed are shared between the main CPU 600d and the subsidiary CPU 601d. By way of example, the main CPU 600d performs surveillance of overrunning or runaway of the subsidiary CPU 601d on the basis of a watchdog (WD) signal generated by the subsidiary CPU 601d.

Further, each of the main CPU 600d and the subsidiary CPU 601d incorporates therein not only a runaway abnormality supervising means for monitoring the runaway of the system but also an abnormality detecting means for detecting occurrence of various sorts of abnormal events at various levels such as abnormalities in the input sensor system, abnormality in the arithmetic operations for the control, abnormality of throttle valve control motor, abnormality of various types of actuators and others to thereby open the load relay while driving an alarm display device as occasion requires.

Furthermore, in association with the abnormality supervising control means, there is provided a siding operation (limp-home operation) control means which is activated in response to operation of an abnormal event storing element (described hereinafter). These abnormality supervising control means are functionally implemented primarily by the subsidiary CPU 601d, while a fuel-cut control means activated when the siding operation is to be performed is functionally implemented by the main CPU 600d.

At this juncture, it should be mentioned that in the siding operation mode, the rotation speed (rpm) of the engine is maintained at a predetermined threshold value and that operation of the motor vehicle is carried out by controlling application of the brake without resorting to manipulation of the accelerator pedal.

However, in the case where locked state of the throttle valve (i.e., the state in which the throttle valve is locked at a position where the opening degree thereof is not smaller than a predetermined opening degree) is detected, application of the brake will then forcibly cause the predetermined threshold value for the engine rotation speed to decrease to a minimum value so that the motor vehicle can positively be stopped without fail.

Further, it should also be mentioned that since such arrangement is adopted that the subsidiary CPU 601d allows lots of input/output signals to pass or flow therethrough in addition to the signals involved in the control of the throttle valve, the subsidiary CPU 601d can supervise other operations than those relevant to the throttle control, which in turn means that the burden imposed on the main CPU 600d can correspondingly be mitigated.

Figure 2:
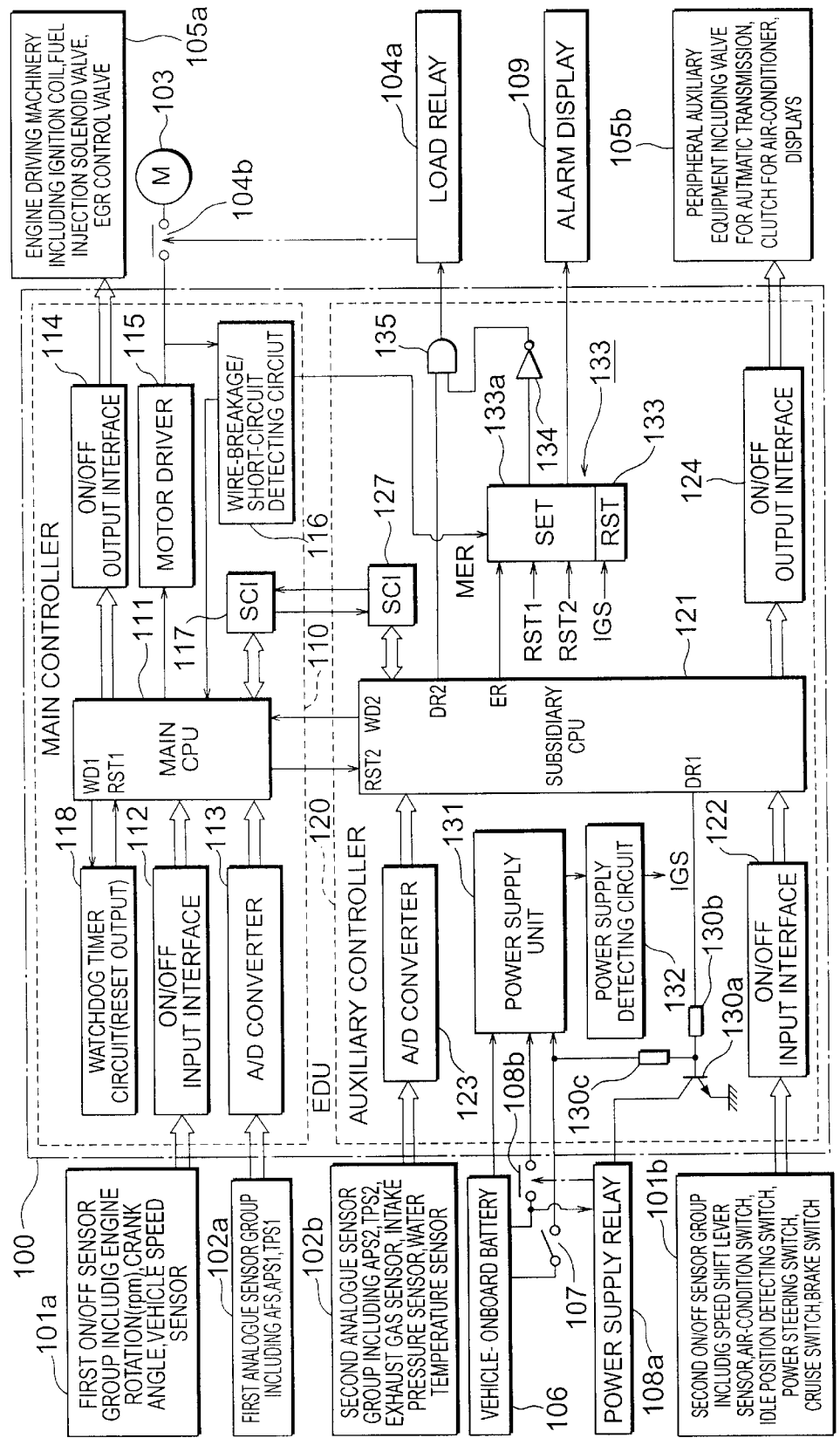
FIG. 2 is a block diagram showing in concrete an arrangement or configuration of the intake air quantity control system according to the first embodiment of the present invention.

Now, referring to FIG. 2, description will be made in detail of the configuration of the intake air quantity control system according to the instant embodiment of the invention. FIG. 2 is a block diagram showing major components and arrangement of the intake air quantity control system according to the first embodiment of the invention.

Referring to FIG. 2, an ECU (Electronic Control Unit) 100 which constitutes a major part of the intake air quantity control system according to the instant embodiment of the invention is comprised of a main controller 110 including a main CPU 111 and an auxiliary controller 120 including a subsidiary CPU 121. The ECU 100 is connected to external input/output devices or equipments by way of a connector means (not shown).

Realized between the main CPU 111 and the subsidiary CPU 121 is a work or function sharing in an appropriate manner for effectuating on/off controls of the engine driving units or machinery 105a destined for the main engine operation controls (such as control of ignition, fuel injection and exhaust gas recirculation or EGR) and a throttle valve designed to be actuated by a throttle valve control motor 103.

The subsidiary CPU 121 receives signals from a second group of on/off sensors (hereinafter also referred to as the second on/off sensor group) collectively designated by a reference symbol 101b and a second group of analogue sensors (hereinafter also referred to as the second analogue sensor group) collectively designated by a reference symbol 102b to thereby transfer these signals to the main CPU 111 through the medium of serial interfaces (SCI) 117 and 127, respectively. In this manner, the subsidiary CPU 121 is in the position to perform the supervisory control of the system as a whole through cooperation with the main CPU 111. Owing to this arrangement, the burden imposed on the main CPU 111 can be mitigated with the fail-safe feature being significantly improved.

At this juncture, description will first be directed to the external elements (various types of sensors and various types of actuators) which are connected to the ECU 100.

A first group 101a of on/off sensors (hereinafter also referred to as the first on/off sensor group 101a) includes an engine rotation detecting sensor (i.e., sensor for detecting engine speed (rpm)), a crank angle sensor, a vehicle speed sensor and the like, the output signals of which are inputted to the main CPU 111 incorporated in the main controller 110 via an on/off signal input interface 112. Incidentally, the output signals of the sensors mentioned above will hereinafter be referred to also as the first on/off signal group only for the convenience of description.

The first on/off signal group contains sensor output signals indicating high-speed/high-frequency operations and bearing relevancy to the control signal for the throttle valve control motor 103. These sensor output signals have on- and off-levels which change at a high frequency. Under the circumstances, the main CPU 111 has to read or fetch these on/off sensor signals at a high rate.

A second group 101b of on/off sensors (hereinafter also referred to as the second on/off sensor group 101b) includes a selected position sensor for detecting a selected position of a transmission shift lever (also referred to as the speed shift position sensor), a switch for an air-conditioner, an idle position detecting switch provided in association with the accelerator pedal, a power steering operation switch, a cruise switch for a constant-speed running (cruising), a brake switch and the like, wherein a second on/off signal group derived from the outputs of these sensors and switches are inputted to the subsidiary CPU 121 incorporated in the auxiliary controller 120 through the medium of an on/off signal input interface 122.

The brake switch (not shown) is so designed as to generate a brake application detecting signal indicative of the stroke or degree of depression of the brake pedal, as is well known in the art.

A second group of on/off signals (hereinafter also referred to as the second on/off signal group) outputted from the second on/off sensor group 101b contains sensor output signals indicative of low-speed/low-frequency operations involved in the relevant controls, respectively. The second on/off signal group will incur substantially no serious problems even if the CPU operation of reading or fetching the on/off-levels of the second on/off signal group should be accompanied with noticeable delay or time lag.

A first group 102a of analogue sensors (hereinafter also referred to as the first analogue sensor group 102a) includes an air-flow sensor AFS for measuring the quantity (or flow rate) of the intake air flowing through the throttle valve, a first accelerator pedal position sensor (APS1) for measuring the depression stroke or degree of the accelerator pedal and a first throttle position sensor (TPS1) for measuring the opening degree of the throttle valve, wherein a first group of analogue signals (also referred to as the first analogue signal group) derived from the outputs of the sensors mentioned above are inputted to the main CPU 111 incorporated in the main controller 110 via an A/D (analogue-to-digital) converter 113.

On the other hand, a second group 102b of analogue sensors (also referred to as the second analogue sensor group 102b) includes a second accelerator pedal position sensor (APS2) for measuring the depression stroke or degree of the accelerator pedal, a second throttle position sensor (TPS2) for measuring the opening degree of the throttle valve, an exhaust gas sensor, a water temperature sensor and an intake pressure sensor, wherein the second analogue signal group is inputted to the subsidiary CPU 121 incorporated in the auxiliary controller 120 by way of an A/D converter 123.

The paired accelerator pedal position sensors APS1 and APS2 as well as the paired throttle position sensors TPS1 and TPS2 are juxtaposed with redundancy to realize the duplex sensor system for ensuring an improved fail-safe feature.

The throttle valve control motor 103 is driven in dependence on the degree of the depression stroke of the accelerator pedal under the control of the ECU 100 for controlling the opening degree of the throttle valve by adjustably opening or closing the throttle valve to thereby regulate the quantity or flow rate of the intake air fed to the engine.

The load relay 104a is actuated under the control of the ECU 100 to open or close an output contact 104b inserted in an input circuitry of the throttle valve control motor 103. In this way, on/off control of the power supply to the throttle valve control motor 103 can be performed.

More specifically, when the load relay 104a is activated, the output contact 104b closes the power supply circuit for the throttle valve control motor 103.

The engine driving machinery (main machinery) 105a include an ignition coil, a fuel injection solenoid valve, an exhaust gas recirculation controlling solenoid valve (or stepping motor) and others for the engine which are controlled by the main CPU 111 incorporated in the main controller 110.

The peripheral auxiliary equipments 105b include a transmission-dedicated solenoid valve (i.e., speed shifting solenoid valve for the transmission gear), an air-conditioner driving electromagnetic clutch, various types of display devices and others.

One electrode of a vehicle-onboard battery 106 is connected to the auxiliary controller 120 by way of a power switch 107 (such as an ignition switch or the like). When the power switch 107 is manually closed, electric power is supplied to the main CPU 111 and the subsidiary CPU 121 from a power supply unit 131 (described hereinafter).

A power supply relay 108a is supplied with electric power from the vehicle-onboard battery 106 for actuating an output contact or switch 108b connected between the vehicle-onboard battery 106 and the power supply unit 131.

An alarm display device 109 is driven under the control of the ECU 100 to issue an alarm relevant to the control of the throttle valve.

Next, description will turn to other constituent parts or components 112 to 118 incorporated in the main controller 110 in addition to the main CPU 111.

The on/off input interface 112 is inserted between the first on/off sensor group 101a and the main CPU 111 to transfer the first on/off signal group to the main CPU 111.

The A/D converter 113 is inserted between the first analogue sensor group 102a and the main CPU 111 to convert the first analogue signal group into the corresponding digital signal group to be inputted to the main CPU 111.

An interfacing power-transistor circuit (on/off output interface) 114 serves as an output interface (I/F) of the main CPU 111. More specifically, the interfacing power-transistor circuit 114 responds to a second control signal issued from the main CPU 111 to thereby perform the on/off control of the engine driving machinery 105a.

Similarly, an interfacing power-transistor circuit (motor driver) 115 serves as another output interface (I/F) of the main CPU 111. More specifically, this interfacing power-transistor circuit 115 responds to a first control signal issued from the main CPU 111 to thereby perform the on/off control of the throttle valve control motor 103.

A wire-breakage/short-circuit detecting circuit 116 for detecting wire-breakage and/or short-circuit event is designed to detect the current flowing through the throttle valve control motor 103. More specifically, when a leak current for wire-breakage detection is absent, indicative of a wire-breakage event in the off-drive mode or when the motor current is greater than a predetermined value, indicating a short-circuit event in the on-drive mode, occurrence of the wire-breakage or short-circuit trouble in the throttle valve control motor 103 is detected by the wire-breakage/short-circuit detecting circuit 116 which then generates an abnormality detection signal MER. In this conjunction, the wire-breakage/short-circuit detecting circuit 116 may be so designed as to additionally detect occurrence of wire-breakage or short-circuit trouble in a wiring circuitry.

The serial interface (SCI) 117 is implemented in the form of a serial-to-parallel converter which cooperates with the serial interface 127 incorporated in the subsidiary CPU 121 to allow various control signals (serial signals) to be transferred between the main CPU 111 and the subsidiary CPU 121.

The watchdog timer circuit 118 constitutes a means for monitoring the runaway abnormality of the main CPU 111. More specifically, the watchdog timer circuit 118 monitors a watchdog signal WD1 generated by the main CPU 111 to thereby generate a first reset signal RST1 unless a pulse train of a predetermined time duration is detected (i.e., upon occurrence of abnormality in the watchdog signal). In that case, the main CPU 111 is reactivated in response to the first reset signal RST1.

Further, the main CPU 111 includes a runaway abnormality supervising means for the subsidiary CPU 121 which is designed to generate a second reset signal RST2 for reactivating the subsidiary CPU 121 upon occurrence of abnormality in the watchdog signal WD2 originating in the subsidiary CPU 121.

Next, description will turn to the constituent parts or components 122 to 135 incorporated in the auxiliary controller 120 in addition to the subsidiary CPU 121.

The on/off input interface 122 is inserted between the second on/off sensor group 101b and the subsidiary CPU 121 to transfer the second on/off signal group to the subsidiary CPU 121.

The A/D converter 123 is connected between the second analogue sensor group 102b and the subsidiary CPU 121 to convert the second analogue signal group into the corresponding digital signal group to be inputted to the subsidiary CPU 121.

An interfacing power-transistor circuit (on/off output interface) 124 serves as an output interface (I/F) of the subsidiary CPU 121. More specifically, the interfacing power-transistor circuit 124 responds to a third control signal which is generated by the main CPU 111 and delivered through the medium of the subsidiary CPU 121 to thereby perform the on/off control of the peripheral auxiliary equipments 105*b*.

The serial interface (SCI) 127 is inserted between the subsidiary CPU 121 and the serial interface 117 of the main CPU 111. The on/off signals generated by the second on/off sensor group 101*b* undergo noise filter processing and the like processing in the subsidiary CPU 121 to be subsequently sent to the main CPU 111 through the medium of the serial interfaces 127 and 117.

Further, the third control signal generated by the main CPU 111 is sent to the subsidiary CPU 121 through the medium of the serial interfaces 117 and 127.

A transistor 130*a* is inserted between the power supply relay 108*a* and the ground potential. The transistor 130*a* is turned on in response to closing of the power switch 107 or in response to a control signal DR1 generated by the subsidiary CPU 121. On the other hand, the power supply relay 108*a* is driven (electrically energized) in response to the turn-on of the transistor 130*a*.

The transistor 130*a* has a base terminal which is connected to the subsidiary CPU 121 via a driving resistor 130*b* and at the same time to the vehicle-onboard battery 106 by way of a driving resistor 130*c* and the power switch 107.

The driving resistor 130*c* and the transistor 130*a* are arranged such that when the power switch 107 is closed, the power supply relay 108*a* is electrically energized to thereby close the output contact 108*b* of the power supply relay 108*a*.

By virtue of the arrangement described above, operation of the power supply relay 108*a* is sustained until the control signal DR1 supplied from the subsidiary CPU 121 via the driving resistor 130*b* is intercepted, even when the power switch 107 is opened. Thus, so long as the power supply relay 108*a* is sustained in the electrically energized state, the CPUs 111 and 121 are capable of executing the processings for the siding operation and the default position restoring operation of actuator(s), as described later on.

The power supply unit 131 operates as a sleep power supply source directly fed from the vehicle-onboard battery 106 and an operation-dedicated power supply source fed from the vehicle-onboard battery 106 by way of the power switch 107 or the output contact 108*b* of the power supply relay 108*a*. By virtue of this arrangement of the power supply unit 131, it is possible to supply predetermined constant stable voltages to the individual circuitries incorporated in the main controller 110 and the auxiliary controller 120.

A power supply detecting circuit 132 is connected to the power supply unit 131 and designed for generating a pulse output IGS of a short duration in response to turn-on or -off of the power switch 107.

An abnormal event storage device 133 includes a set input module 133*a* adapted to be set in response to abnormality detection signals MER, ER, RST1 and RST2 and a reset input module 133*b* adapted to be reset by the power supply detecting circuit 132.

More specifically, inputted to the set input module 133*a* of the abnormal event storage device 133 are the abnormality detection signal MER outputted from the wire-breakage/short-circuit detecting circuit 116, an error signal ER generated by the subsidiary CPU 121 and reset signals RST1 and RST2 for the CPUs 111 and 121, respectively.

In other words, the abnormal event storage device 133 is set in response to the abnormality detection signal MER indicative of wire-breakage or short-circuit trouble of the throttle valve control motor 103, the first reset signal RST1, the second reset signal RST2 and the error signal ER originating in the subsidiary CPU 121, while being reset in response to the pulse output IGS supplied from the power supply detecting circuit 132.

Furthermore, the pulse output IGS is inputted to the reset input module 133*b* of the abnormal event storage device 133 from the power supply detecting circuit 132.

A negation logic element (NOT element) 134 serves to invert the set signal SET delivered from the set input module 133*a*, the inverted signal being then inputted to a gate element 135.

The gate element 135 is inserted between the subsidiary CPU 121 and the load relay 104*a* for logically ANDing a control signal DR2 generated by the subsidiary CPU 121 and the set signal SET supplied via the negation logic element 134, the logical product thus determined being then used for controlling the load relay 104*a*.

When the set signal SET is generated, the gate element 135 is blocked via the negation logic element 134. Thus, the load relay 104*a* is held in the electrically deenergized state even when the control signal DR2 is issued by the subsidiary CPU 121.

The output terminal of the set input module 133*a* is connected to the alarm display device 109. The abnormal event storage device 133 is designed to open the load relay 104*a* while driving the alarm display device 109 in response to a set signal SET.

Further, the main CPU 111 is designed to monitor the watchdog signal WD2 of the subsidiary CPU 121 to thereby generate the second reset signal RST2 unless the pulse train of the watchdog signal WD2 has a predetermined time duration. The subsidiary CPU 121 is then reactivated in response to the second reset signal RST2. Incidentally, the function or role of the error signal ER will be described hereinafter in more concrete by referring to a flow chart shown in FIG. 7.

Next, referring to FIG. 3, description will be made more concretely of a throttle valve control mechanism of the intake air quantity control system according to the first embodiment of the invention.

Figure 3:
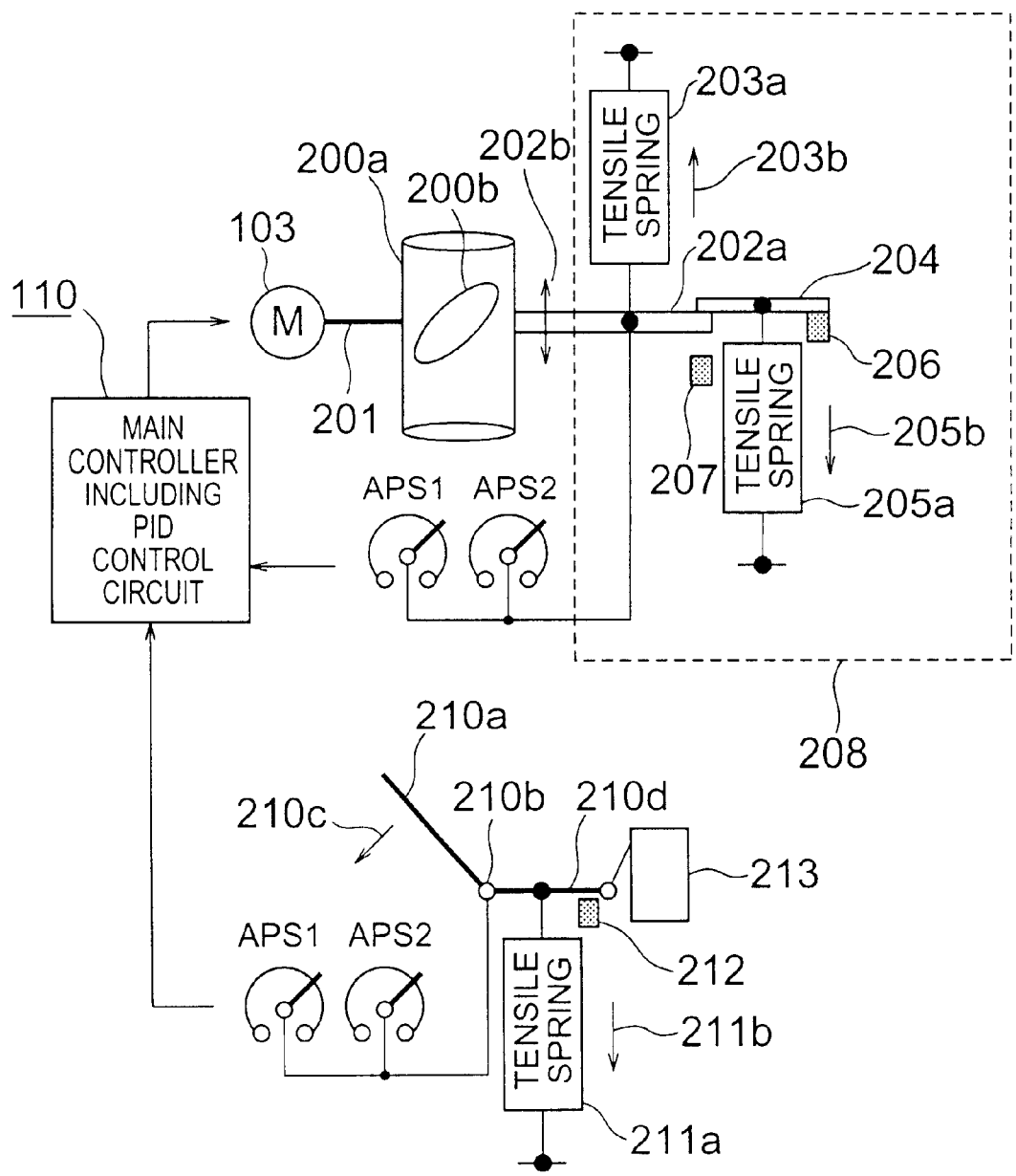
FIG. 3 is a view showing a structure of a default mechanism employed in the intake air quantity control system according to the first embodiment of the invention.

Referring to FIG. 3, the main controller 110 includes a PID control unit for performing an on/off duty ratio control of the throttle valve control motor 103.

An intake throttle unit 200*a* includes a throttle valve 200*b*. The throttle valve 200*b* is operatively coupled to a rotatable shaft 201 of the throttle valve control motor 103 to be thereby opened or closed under the control of the intake throttle unit 200*a*.

A directly coupled swingable member 202*a* interlocked with the rotatable shaft 201 is disposed as a coaxial extension of the rotatable shaft 201 and provided with tensile springs 203*a* and 205*a*, a restoring member 204, a default stopper 206 and an idle stopper 207.

At this juncture, it should be added that the directly coupled swingable member 202*a*, the tensile springs 203*a* and 205*a*, the restoring member 204, the default stopper 206 and the idle stopper 207 cooperate to constitute a so-called default mechanism 208.

Further, it should be mentioned that the directly coupled swingable member 202*a* is presumed to be movable vertically, i.e., upwardly and downwardly, as indicated by a double-head arrow 202*b*, only for the convenience of description. The tensile spring 203*a* resiliently urges the directly coupled swingable member 202*a* in the direction indicated by an arrow 203*b* (i.e., in the valve opening direction).

The restoring member 204 is resiliently urged in the direction indicated by an arrow 205b (i.e., in the valve closing direction) by means of the tensile spring 205a to thereby cause the directly coupled swingable member 202a to be restored in the valve closing direction by overcoming the resilient urgency exerted by the tensile spring 203a.

The default stopper 206 regulates the restoration position of the restoring member 204. On the other hand, the idle stopper 207 is provided at such a position that the directly coupled swingable member 202a can bear against the default stopper 206 when the directly coupled swingable member 202a is driven in the valve closing direction from the state where the restoring member 204 has been restored to the position delimited by the default stopper 206.

The default position restoring mechanism shown in FIG. 3 is so structured that when the power supply to the throttle valve control motor 103 is interrupted, the throttle valve is automatically restored to the position where the opening degree of the throttle valve is slightly greater than that in the idle operation mode. The position mentioned above is referred to as the default position.

In other words, within the range which extends from the default position delimited by the default stopper 206 to the position of the idle stopper 207, the opening degree of the throttle valve is controlled by means of the throttle valve control motor 103 against the force of the tensile spring 203a, while for the throttle valve opening operation in the range exceeding the default position, the throttle valve opening control is performed by the throttle valve control motor 103 through cooperation of the tensile spring 203a against the force of the tensile spring 205a.

Thus, when the power supply to the throttle valve control motor 103 is interrupted, the directly coupled swingable member 202a performs the throttle valve closing or opening operation up to the position delimited by the default stopper 206 under the action of the tensile springs 205a and 203a.

In this case, the default position corresponds to the opening degree of the throttle valve in the siding operation carried out upon occurrence of an abnormal event.

However, when such actuator trouble should take place which inhibits restoration to the target default position due to occurrence of abnormal event in the gear mechanism, it is expected that the situation in which the throttle valve is locked at the position corresponding to a very large opening degree may occur, which has to be taken into account.

The first and second throttle position sensors (TPS1 and TPS2) are so disposed in association with the default mechanism 208 as to detect the operating position of the directly coupled swingable member 202a (i.e., the opening degree of the throttle valve). The opening degree of the throttle valve as detected is supplied to the main controller (PID control unit) 110.

The accelerator pedal 210a is adapted to be depressed around a pivotal point 210b in the direction indicated by an arrow 210c.

A coupling member 210d is operatively connected to the accelerator pedal 210a via the pivotal point 210b and resiliently urged by a tensile spring 211a in the direction indicated by an arrow 211b, whereby the accelerator pedal 210a is urged or driven in the restoring direction.

A pedal stopper 212 delimits the restoration position of the accelerator pedal 210a.

An idle switch 213 serves for detecting that the accelerator pedal 210a is in the state restored to the position delimited by the pedal stopper 212 under the action of the tensile spring 211a in the state where the accelerator pedal 210a is not depressed. In other words, the idle switch 213 serves to detect the idle state.

The first and second accelerator pedal position sensors APS1 and APS2 are so disposed as to detect the degree of depression of the accelerator pedal 210a with reference to the pivotal point 210b. The depression degree of the accelerator pedal as detected is supplied to the main controller (PID control unit) 110.

At this juncture, it should be mentioned that the throttle valve control motor 103 may be constituted by a DC motor, a brushless motor, a stepping motor or the like. However, in the case of the intake air quantity control system now under consideration, it is assumed that the throttle valve control motor 103 is implemented as the DC motor which can undergo the on/off duty ratio control of the main CPU 111 incorporated in the main controller 110 (see FIG. 2).

Now, referring to FIG. 4, description will be made of the control of the whole engine system according to the first embodiment of the present invention.

Figure 4:
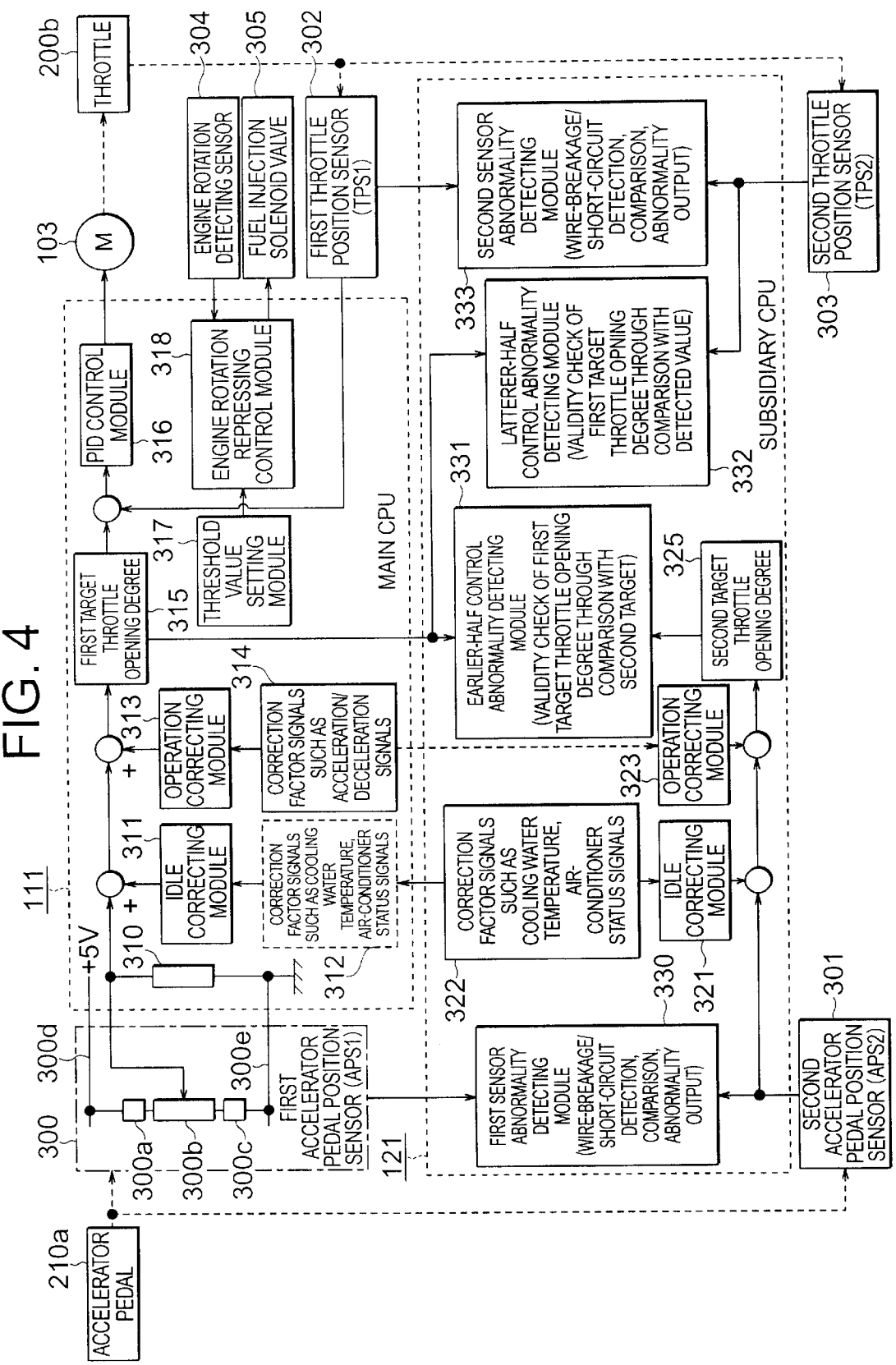
FIG. 4 is a functional block diagram showing in concrete an arrangement of major parts of the intake air quantity control system according to the first embodiment of the invention.

FIG. 4 is a functional block diagram showing in concrete an arrangement of the main CPU 111 and the subsidiary CPU 121 in the intake air quantity control system according to the first embodiment of the invention.

Referring to FIG. 4, the first and second accelerator pedal position sensors APS1 and APS2 provided in association with the accelerator pedal 210a are designated by reference numerals 300 and 301, respectively, while the first and second throttle position sensors (TPS1 and TPS2) provided in association with the throttle valve 200b are denoted by reference numerals 302 and 303, respectively.

Internal structures of the sensors 300 to 303 are essentially similar to one another. Accordingly, shown representatively in FIG. 4 is an internal structure of only the first accelerator pedal position sensor (APS1) 300. As can be seen in FIG. 4, the first accelerator pedal position sensor (APS1) 300 is comprised of a serial circuit of a positive-side resistor 300a, a variable resistor 300b and a negative-side resistor 300c.

The serial resistor circuit incorporated in the first accelerator pedal position sensor (APS1) 300 is connected between a power supply line 300d of positive polarity and a power supply line 300e of negative polarity (ground potential) and is so designed as to take out the detection signal from a slideable terminal of the variable resistor 300b.

With the arrangement described above, the sensor output voltage in the normal state assumes a value within a range of e.g. 0.2 to 4.8 volts. However, upon occurrence of trouble such as wire-breakage, short-circuit, contact fault of the variable resistor or the like, the sensor output voltage will assume a value deviated from the range mentioned above.

Connected to the main CPU 111 are the first accelerator pedal position sensor (APS1) 300, the first throttle position sensor (TPS1) 302, the throttle valve control motor 103, an engine rotation detecting sensor (engine speed sensor) 304 and a fuel injection solenoid valve 305.

In the main CPU 111, a pull-down resistor 310 is inserted between a detection signal line tapped from the variable resistor 300b and the ground potential. Thus, upon occurrence of breakage of the detection signal line, the contact fault of the variable resistor 300b and the like, the signal voltage inputted to the CPU 111 assumes zero.

An idle correcting module 311 is provided in association with the detection signal line of the first accelerator pedal position sensor (APS1) 300 and serves for correcting the idle rotation speed of the engine (i.e., engine speed in the idle operation) so that it increases when the air-conditioner is put into operation or when the temperature of the engine cooling water is low.

A correction factor signal 312 inputted to the idle correcting module 311 is derived from the input information (e.g. signals indicative of the state of the air-conditioner and the temperature of the cooling water) sent to the main CPU 111 from the subsidiary CPU 121 by way of the serial interfaces 127 and 117 (see FIG. 2).

On the other hand, an operation correcting module 313 is provided also in association with the detection signal line of the first accelerator pedal position sensor (APS1) 300 for correcting the fuel supply quantity so that it increases or decreases in dependence on the engine operation state. By way of example, when the acceleration performance is to be enhanced in response to steep depression of the accelerator pedal 210a (see FIG. 3), the operation correcting module 313 increases the fuel supply quantity, whereas the operation correcting module 313 suppresses or decreases the fuel supply quantity in a steady constant-speed driving operation.

A correction factor signal 314 inputted to the operation correcting module 313 is generated internally of the main CPU 111 on the basis of various species of factors such as the rate of depression of the accelerator pedal 210a (differential quotient or derivative of the output signal of the first accelerator pedal position sensor APS1).

A first target throttle opening degree 315 is arithmetically determined by the main CPU 111 as a desired or target value of the opening degree of the throttle valve. More specifically, the first target throttle opening degree 315 can be determined through algebraic addition of the increase/decrease correcting values arithmetically determined by the idle correcting module 311 and the operation correcting module 313 to the value of the output signal voltage of the first accelerator pedal position sensor (APS1) 300 indicative of the depression degree of the accelerator pedal 210a.

A PID control module 316 serves for the on/off duty ratio control of the throttle valve control motor 103 so that the output signal voltage of the first throttle position sensor TPS1 indicative of the actual opening degree of the throttle valve coincides with the signal voltage of the first target throttle opening degree 315.

A threshold value setting module 317 serves for exchangeably setting a threshold value for the rotation speed (rpm) of the engine.

When abnormal event occurs in the throttle valve control system (as described hereinafter), an engine rotation repressing control module 318 is activated to thereby repress or control the fuel quantity supplied to the fuel injection solenoid valve 305 so that the actual rotation speed of the engine determined on the basis of the output signal of the engine rotation detecting sensor 304 and the threshold value for the engine speed set by the threshold value setting module 317 become equal to each other.

More specifically, when the load relay 104a is opened, the engine rotation repressing control module 318 responds to the difference between the predetermined threshold value for the rotation speed (rpm) of the engine and the actual rotation speed (rpm) of the engine to thereby regulate the quantity of fuel injected through the fuel injection solenoid valve 305 so that the difference mentioned above makes disappearance.

Next, description will turn to the subsidiary CPU 121 which is connected to the main CPU 111.

Connected to the subsidiary CPU 121 are the first accelerator pedal position sensor (APS1) 300, the first throttle position sensor (TPS1) 302, the second accelerator pedal position sensor (APS2) 301 and the second throttle position sensor (TPS2) 303.

In the subsidiary CPU 121, an idle correcting module 321 is provided in association with the detection signal line of the second accelerator pedal position sensor (APS2) and serves for correcting the idle rotation speed of the engine (i.e., engine speed in the idle operation mode) so that it may increase when the air-conditioner is put into operation or when the temperature of the engine cooling water is low.

A correction factor signal 322 inputted to the idle correcting module 321 is generated on the basis of the information (signals indicative of the status of the air-conditioner and the temperature of the cooling water) inputted directly to the subsidiary CPU 121.

An operation correcting module 323 is provided in association with the detection signal line of the second accelerator pedal position sensor (APS2) for correcting the fuel supply quantity so that it increases or decreases in dependence on the operation state. By way of example, when the acceleration performance is to be enhanced in response to steep depression of the accelerator pedal 210a, the operation correcting module 323 increases the fuel supply quantity, whereas the operation correcting module 323 serves to suppress or decrease the fuel supply quantity in the steady constant-speed driving operation.

The correction factor signal 314 inputted to the operation correcting module 323 is generated internally of the main CPU 111 to be transferred to the subsidiary CPU 121 via the serial interfaces 117 and 127.

However, the pedal depression rate of the accelerator pedal 210a is arithmetically determined by the subsidiary CPU 121 as the derivative (differential quotient) of the output signal of the second accelerator pedal position sensor (APS2). Further, the various species of factors which can arithmetically be determined solely by the main CPU 111 may be neglected by the subsidiary CPU 121. In that case, the correction for the engine operation will be performed only approximately.

A second target throttle opening degree 325 is arithmetically determined by the subsidiary CPU 121 as a desired or target value of the opening degree of the throttle valve. More specifically, the second target throttle opening degree 325 can be determined by algebraic addition of the increase/decrease correcting values arithmetically determined by the idle correcting module 321 and the operation correcting module 323 to the value of the output signal voltage of the second accelerator pedal position sensor (APS2) generated in response to the depression degree of the accelerator pedal 210a.

A first sensor abnormality detecting module 330 serves to detect the wire-breakage/short-circuit abnormality and the relative output abnormality of the paired accelerator pedal position sensors (APS1) and (APS2) to thereby generate an error signal ER as the first sensor abnormality detection signal (described hereinafter by reference to FIG. 7).

In this conjunction, arrangement may be made such that the output voltage (detection signal voltage) of the first accelerator pedal position sensor (APS1) is sent to the subsidiary CPU 121 from the main CPU 111 via the serial interfaces 117 and 127 or alternatively the output voltage of the first accelerator pedal position sensor (APS1) is inputted directly to both the main CPU 111 and the subsidiary CPU 121.

The abnormality detecting means includes a first-half or earlier-half control abnormality detecting module 331 and a second-half or latter-half control abnormality detecting module 332.

The earlier-half control abnormality detecting module 331 is so designed as to decide the validity of the first target throttle opening degree 315 by comparing the first target throttle opening degree 315 and the second target throttle opening degree 325.

On the other hand, the latter-half control abnormality detecting module 332 is so designed as to decide the validity of the first target throttle opening degree 315 by comparing the first target throttle opening degree 315 and the detection signal inputted to the subsidiary CPU 121 from the second throttle position sensor (TPS2) 303.

In this manner, the earlier-half control abnormality detecting module 331 and the latter-half control abnormality detecting module 332 generate the error signal ER upon detection of occurrence of abnormal event to thereby set the abnormal event storage device 133.

The earlier-half control abnormality detecting module 331 incorporated in the subsidiary CPU 121 compares the signal voltage indicating the first target throttle opening degree 315 supplied from the main CPU 111 via the serial interfaces 117 and 127 with the signal indicative of the second target throttle opening degree 325 determined approximately by the subsidiary CPU 121, to thereby output an abnormality detection signal when difference exceeding a predetermined ratio is found between both the signals mentioned above.

The earlier-half control abnormality detecting module 331 is designed to make decision as to whether or not the arithmetically determined value of the second target throttle opening degree 325 falls within the abnormal range for the output signal voltage indicative of the first target throttle opening degree 315.

Figure 5:
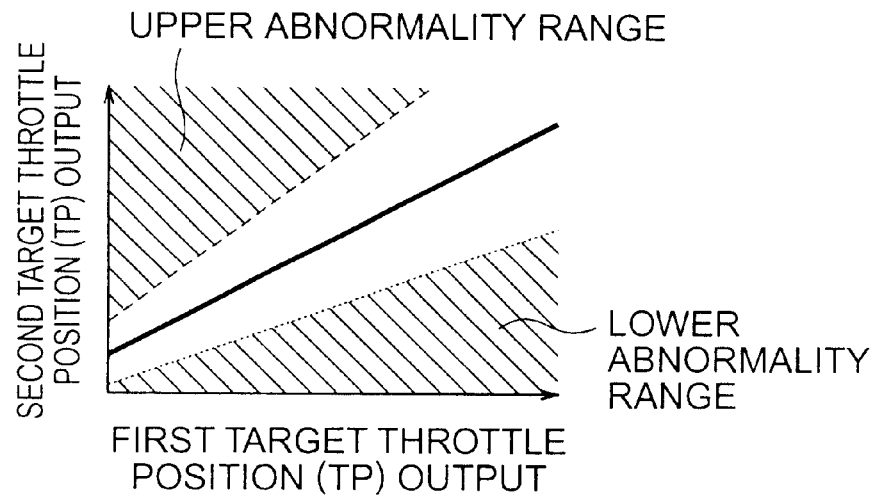
FIG. 5 is a view for graphically illustrating abnormality ranges as decided by an earlier-half control abnormality detecting module in the intake air quantity control system according to the first embodiment of the invention.

FIG. 5 is a view for illustrating the abnormal ranges as decided by the earlier-half control abnormality detecting module 331, wherein the output signal voltage indicative of the first target throttle opening degree 315 is taken along the abscissa with the arithmetically determined voltage value indicative of the second target throttle opening degree 325 being taken along the ordinate. In the figure, hatched areas indicate the abnormal ranges (upper range of abnormality and lower range of abnormality).

Turning back to FIG. 4, the latter-half control abnormality detecting module 332 incorporated in the subsidiary CPU 121 compares the corrected value of the first target throttle opening degree 315 supplied from the main CPU 111 with the actual opening degree of the throttle valve detected by the second throttle position sensor (TPS2) 303 to thereby decide whether or not the actually detected opening degree of the throttle valve lies within the range of abnormality.

Figure 6:
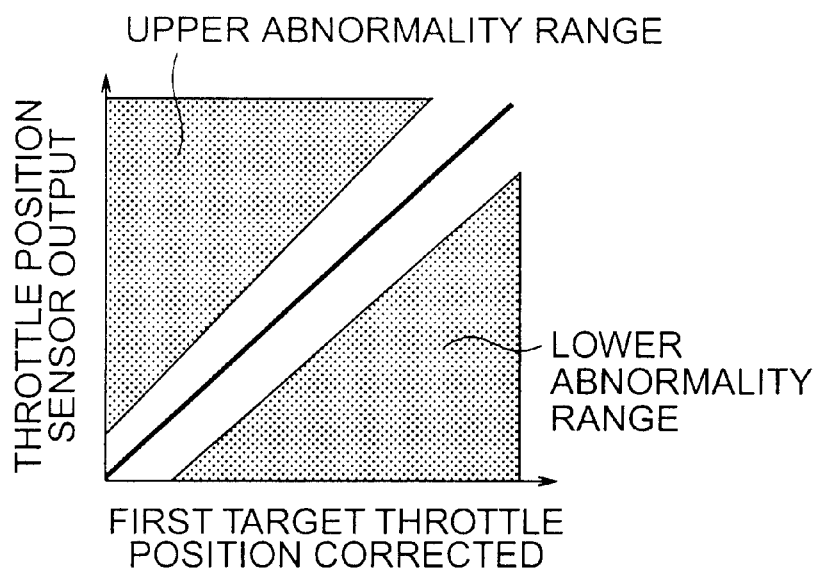
FIG. 6 is a view for graphically illustrating abnormality ranges as decided by a latter-half control abnormality detecting module in the intake air quantity control system according to the first embodiment of the invention.

FIG. 6 is a view for illustrating the abnormal ranges as decided by the latter-half control abnormality detecting module 332, wherein the corrected value of the first target throttle opening degree 315 is taken along the abscissa with the actual opening degree of the throttle valve detected by the second throttle position sensor (TPS2) 303 being taken along the ordinate. In the figure, the areas in black indicate the abnormal ranges (upper range of abnormality and lower range of abnormality).

Incidentally, the correction of the first target throttle opening degree 315 by the latter-half control abnormality detecting module 332 can be realized by algebraic subtraction of a value proportional to the derivative (differential quotient) of the first target throttle opening degree 315 from the latter.

In this way, transient error involved in the decision can effectively be suppressed by performing the correcting arithmetic operation in anticipation of the delay in the response of the actuator.

A second sensor abnormality detecting module 333 serves to detect the wire-breakage/short-circuit abnormality and the relative output abnormality of the paired throttle position sensors (TPS1) 302 and (TPS2) 303 to thereby generate an error signal ER as the second sensor abnormality detection signal (described hereinafter by reference to FIG. 7).

In this conjunction, arrangement may be made such that the output voltage (detection signal voltage) of the first throttle position sensor TPS1 is sent to the subsidiary CPU 121 from the main CPU 111 via the serial interfaces 117 and 127 or alternatively the output voltage of the first throttle position sensor TPS1 is inputted directly to both the main CPU 111 and the subsidiary CPU 121.

As can now be appreciated from the foregoing, in the subsidiary CPU 121, the first sensor abnormality detecting module 330 and the second sensor abnormality detecting module 333 perform abnormality check of the input signals, while the earlier-half control abnormality detecting module 331 performs the earlier-half control abnormality detection during a period in which the target opening degree of the throttle valve is arithmetically determined on the basis of the input signals with the latter-half control abnormality detecting module 332 preforming the latter-half control abnormality detection until the actual feedback input signal voltage is determined on the basis of the target opening degree of the throttle valve.

Additionally, the latter-half control abnormality detecting module 332 is designed to serve for the function of detecting abnormality in the throttle valve control motor 103 and the actuators in order to dispose of such problem that in case the throttle valve should be locked due to mechanical abnormality, the target opening degree of the throttle valve and the actual opening degree of the throttle valve do not coincide with each other even if the normal control is effectuated.

Next, referring to the flow chart shown in FIG. 7, description will be made of the abnormality detection processing (error signal generating operation) in the intake air quantity control system according to the first embodiment of the invention described hereinbefore by reference to FIGS. 1 to 4.

Figure 7:
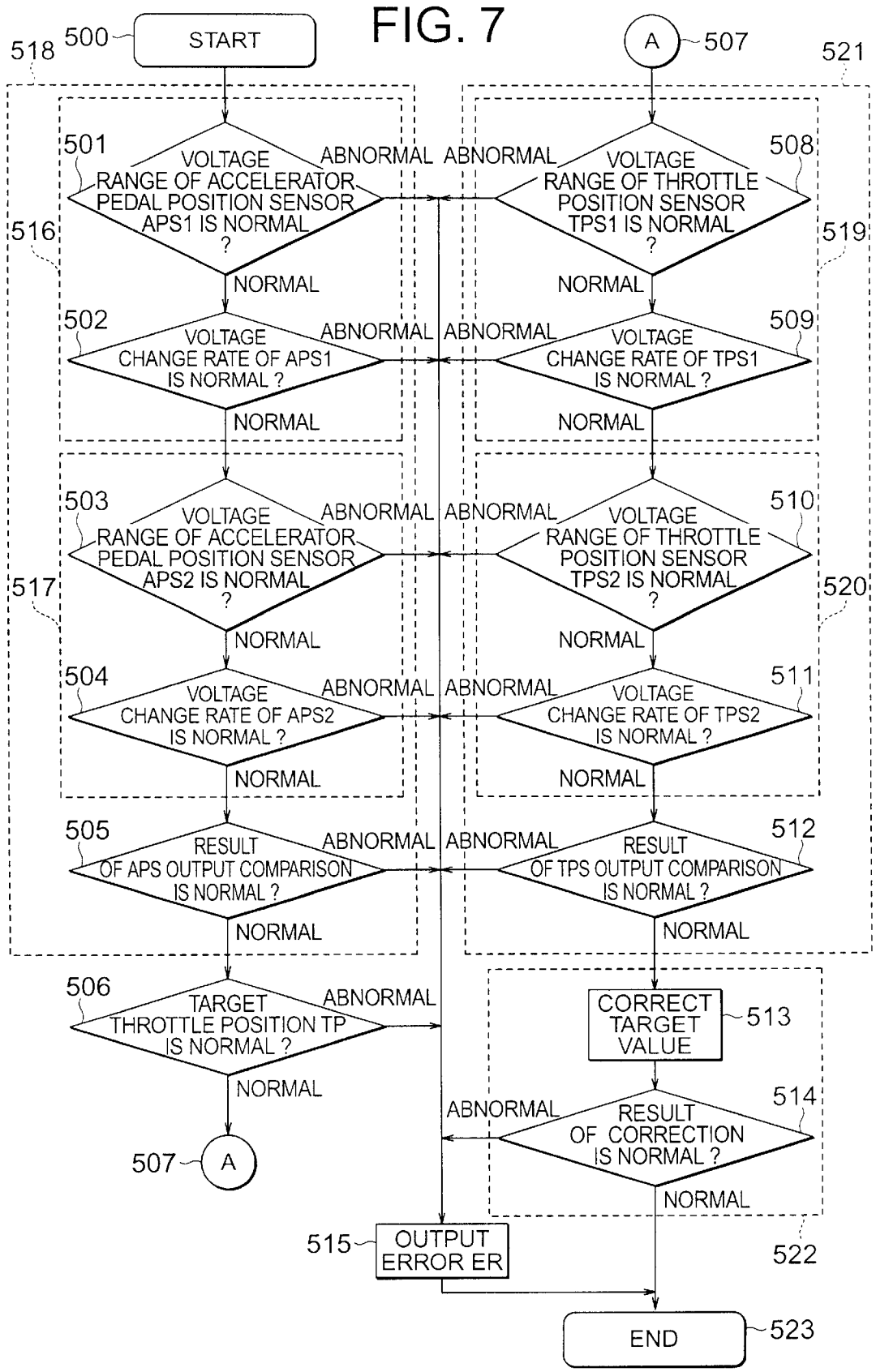
FIG. 7 is a flow chart for illustrating an abnormality decision processing procedure executed in the intake air quantity control system according to the first embodiment of the invention.

FIG. 7 illustrates an operation or processing routine executed by the subsidiary CPU 121 for generating the error signal ER (see FIG. 2).

The processing routine shown in FIG. 7 is activated periodically through interrupt operation in a processing start step 500.

Subsequently, in an abnormality decision step 501, decision is made as to whether or not the signal voltage outputted from the first accelerator pedal position sensor (APS1) lies within the range of abnormality.

More specifically, in the abnormality decision step 501, it is decided whether or not the output signal voltage of the first accelerator pedal position sensor (APS1) assumes a value within a range of e.g. 0.2 to 4.8 volts. When the output signal voltage of the first accelerator pedal position sensor (APS1) falls within the voltage range mentioned above, it is determined that the operation state is normal. On the other hand, when the output signal voltage of the first accelerator pedal position sensor is out of the range mentioned above, it is then decided that abnormality such as wire-breakage and/or contact fault of the detection signal line or short-circuit (faulty contact) to the positive/negative power supply lines or other power supply lines is taking place.

When the normal operation state is determined in the abnormality decision step 501, then the processing proceeds to a succeeding abnormality decision step 502 for making decision as to the rate of change of the output voltage of the first accelerator pedal position sensor (APS1). More specifically, the voltage change rate is determined on the basis of the deviation or difference between the output voltage detected in the preceding routine cycle and that detected currently. When the behavior of the voltage change rate is so abnormal that it can not be expected in the normal state, it is then decided that abnormal event such as the wire-breakage or short-circuit mentioned previously is taking place.

In case the normality is determined in the abnormality decision step 502, then abnormality decision steps 503 and 504 similar to the steps 501 and 502 are executed. Namely, in the steps 503 and 504, abnormality decision is made concerning the output voltage of the second accelerator pedal position sensor (APS2).

When it is decided in the abnormality decision steps 503 and 504 that the operation state is normal, the processing proceeds to a succeeding abnormality decision step 505, where abnormality decision is performed by comparing the output signal of the first accelerator pedal position sensor (APS1) with that of the second accelerator pedal position sensor (APS2).

More specifically, in the abnormality decision step 505, the output voltages of the first accelerator pedal position sensor (APS1) and the second accelerator pedal position sensor (APS2) are compared with each other to thereby decide whether or not coincidence is found between these output voltages within a predetermined permissible range of error. When the difference between these output voltages is greater than a predetermined value, abnormality is decided.

When the abnormality decision step 505 results in the normal state, the processing proceeds to a succeeding abnormality decision step 506. In this abnormality decision step 506, the value of the first target throttle opening degree 315 is compared with that of the second target throttle opening degree 325, as described hereinbefore in conjunction with the earlier-half control abnormality detecting module 331 (refer to FIG. 4). In the case where difference between these values is greater than a predetermined value (error value), abnormal state is decided.

In the case where normality is decided in the abnormality decision step 506, the processing then proceeds to succeeding abnormality decision steps 508 and 509 via a relaying step 507. In the abnormality decision steps 508 and 509, abnormality decision is made concerning the output voltage of the first throttle position sensor (TPS1), as in the case of the steps 501 and 502 described previously.

On the other hand, in the case where normality is decided in the abnormality decision steps 508 and 509, the processing proceeds to succeeding abnormality decision steps 510 and 511. In the abnormality decision steps 510 and 511, abnormality decision is made concerning the output voltage of the second throttle position sensor (TPS2) similarly to the steps 508 and 509 described previously.

When the abnormality decision steps 510 and 511 result in the normal state, the processing proceeds to a succeeding abnormality decision step 512. In this abnormality decision step 512, the output voltages of the first throttle position sensor (TPS1) and the second throttle position sensor (TPS2) are compared with each other to thereby decide whether or not coincidence is found between these output voltages within a predetermined permissible range of error. When difference or error between these output voltages is greater than a predetermined value (error value), then abnormality is decided.

When the abnormality decision step 512 results in the normal state, the processing proceeds to a succeeding correcting operation step 513. In this correcting operation step 513, the expected opening degree of the throttle valve is arithmetically determined in anticipation of the delay in response of the actuator to the signal voltage indicative of the first target throttle opening degree 315, as described hereinbefore in conjunction with the latter-half control abnormality detecting module 332 (refer to FIG. 4).

In succession, in an abnormality decision step 514, the opening degree of the throttle valve estimated in the correcting operation step 513 is compared with the output voltage of the second throttle position sensor (TPS2) (detected opening degree of the throttle valve) to thereby decide abnormality of the control when the comparison results in difference which is greater than a predetermined value.

An error signal output step 515 is executed when abnormality decision is made in at least one of the abnormality decision steps 501 to 506, 508 to 512 and 514, whereby the error signal ER (see FIG. 2) is issued by the subsidiary CPU 121.

At the end of the operation performed in the error signal output step 515 or when normality decision is made in all the abnormality decision steps 501 to 506, 508 to 512 and 514, the processing proceeds to an end step 523, whereupon the processing routine shown in FIG. 7 is exited or terminated.

Subsequently, the standby state is continued in the end step 523 until the start step 500 is activated again.

Parenthetically, it should be mentioned that in the processing step 516 (including the steps 501 and 502) shown in a broken line frame in FIG. 7, occurrence of wire-breakage or short-circuit in the first accelerator pedal position sensor (APS1) is detected, while in the processing step 517 (including the steps 503 and 504), occurrence of wire-breakage or short-circuit in the second accelerator pedal position sensor (APS2) is detected.

The processing step 518 including the steps 501 to 505 is executed by the first sensor abnormality detecting module 330 (see FIG. 4).

Further, it should also be mentioned that in the processing step 519 (including the steps 508 and 509) shown in a broken line frame in FIG. 7, occurrence of wire-breakage or short-circuit in the first throttle position sensor (TPS1) is detected, while in the processing step 520 (including the steps 510 and 511), occurrence of wire-breakage or short-circuit in the second throttle position sensor (TPS2) is detected.

The processing step 521 including the steps 508 to 512 is executed by the second sensor abnormality detecting module 333 (see FIG. 4).

Further, the processing step 522 (including the steps 513 and 514) shown in a dotted line frame in FIG. 7 is executed by the latter-half control abnormality detecting module 332 (see FIG. 4).

In the foregoing, description has been directed to the individual functions/operations by reference to FIGS. 1 to 4. In the following, description will be made synthetically of the disposals for coping with the various abnormality deciding operations as well as the results of the abnormality decision by reference to the flow chart shown in FIG. 7 together with FIG. 2.

Referring to FIG. 2, four types of abnormality detection signals MER, ER, REST1 and RST2 are inputted to the set input module 133a of the abnormal event storage device 133.

The set input module 133a is designed for storing the first and second reset signals RST1 and RST2 in conjunction with the abnormality of the functions of the main CPU 111 and the subsidiary CPU 121, respectively.

Concerning the abnormality of the arithmetic operations performed by the main CPU 111 and the subsidiary CPU 121 for the throttle valve control, the set input module 133a stores the error signal ER issued by the subsidiary CPU 121 on the basis of the results of the earlier-half and latter-half control abnormality detecting steps 506 and 514 described previously by reference to FIG. 7. To say in another way, the set input module 133a serves for the duplex abnormality detection storage function.

Furthermore, the set input module 133a is designed to store the error signal ER after the wire-breakage or short-circuit abnormality of the accelerator pedal position sensors (APS) and the throttle position sensors (TPS) has been checked duplicately in the abnormality detection steps 516, 517, 519 and 520 and the relevant output abnormality detection steps 505 and 512 shown in FIG. 7.

Additionally, the set input module 133a is designed to store the error signal ER when difference is found between the detected values of the first accelerator pedal position sensor (APS1) and the second accelerator pedal position sensor (APS2) and/or between the detected values of the first throttle position sensor (TPS1) and the second throttle position sensor (TPS2) on the basis of the results of the earlier-half and latter-half control abnormality detection steps 506 and 514.

Additionally, concerning the abnormal event of the throttle valve control motor 103, the set input module 133a is designed to store the abnormality detection signal MER delivered from the wire-breakage/short-circuit detecting circuit 116 (see FIG. 2) and at the same time the error signal ER issued on the basis of the result of the abnormality detection step 514 executed by the latter-half control abnormality detecting module 332 (see FIG. 4).

The throttle valve open/close mechanism (see FIG. 3) is provided with the default mechanism 208 to secure the fail-safe operation. In this conjunction, the set input module 133a is also so designed as to store the error signal ER detected concerning the mechanical abnormality of the default mechanism 208 in the latter-half control abnormality detection step 514.

When operation of the abnormal event storage device 133 is triggered in response to the various abnormalities mentioned above, the alarm display device 109 is put into operation to inform the operator or driver of the abnormal event, and the load relay 104a is electrically deenergized to interrupt the power supply to the throttle valve control motor 103, as a result of which the throttle valve 200b is restored to the default position by means of the default mechanism 208 (see FIG. 3).

In the abnormal state such as mentioned above, the rotation speed (rpm) of the engine is repressed so as not to exceed the predetermined threshold value by means of the engine rotation repressing control module 318 (see FIG. 4), and the siding operation can be performed in dependence on the depression degree of the brake pedal.

Parenthetically, in case runaway of the CPU should occur due to temporary erroneous operation brought about by e.g. noise, the CPU itself is once automatically reset to be subsequently activated to thereby restore the normal operation state. In that case, the abnormal event storage device 133 stores the occurrence of abnormality, whereby the alarm display device 109 is activated and/or the throttle valve 200b is restored to the default position.

However, when the power switch 107 is once opened and closed again, the abnormal event storage device 133 is reset in response to the pulse output IGS, as a result of which the normal operation state inclusive of the throttle control is restored.

Furthermore, in the case where the abnormality is not of transitory nature, differing from the noise-ascribable erroneous operation, the abnormal event storage device 133 can again detect the abnormality to store it even when the abnormal event storage device 133 is once reset by means of the power switch 107.

By controlling unitarily or uniformly the first and second control signals for the main machinery (engine driving machinery) 105a and the throttle valve control motor 103 closely related to the engine speed control with the main CPU 111 in this manner, transfer or transaction of the control signals bearing relevancy to one another can be much facilitated, whereby the response and operation performance can significantly be improved.

Needless to say, a lot of input/output signals pass or flow through the subsidiary CPU 121 via the serial interfaces 117 and 127. Thus, not only the relevant control of the throttle valve control motor 103 but also supervisory control of the peripheral auxiliary equipments 105b can satisfactorily be performed by means of the subsidiary CPU 121, whereby the fail-safe feature of the whole system can significantly be improved with the burden imposed on the main CPU 111 being reduced.

Besides, because lots of input/output signals are transferred between the CPUs 111 and 121 via the serial interfaces 117 and 127, the number of the input/output terminals for the main CPU 111 can remarkably be reduced.

Thus, the main CPU 111 can be implemented in the form of a small-size IC chip. Besides, logic circuits for improving the functions and response performance can additionally be provided for the main CPU 111.

Moreover, the main CPU 111 can independently control the throttle valve 200b while the subsidiary CPU 121 can by itself supervise the control state of the throttle valve 200b. Thus, the fail-safe feature can further be improved.

Further, even when the CPUs 111 and/or 121 should perform erroneous operation transitorily due to noise or the like, the CPUs can immediately be restored to the normal state, whereby the ignition control and the fuel injection control can normally be continued without suffering any appreciable adverse influence of the transient disturbance.

Furthermore, even if the CPUs 111 and 121 should transitorily suffer erroneous operation, it is possible to stop the throttle control which plays a significant role in ensuring the fail-safe operation of the motor vehicle and close again the power switch 107 to thereby restore the throttle control because the abnormal event storage device 133 is provided as described hereinbefore. This feature also contributes to enhancing the fail-safe.

In that case, the alarm display device 109 can also be activated so that the operator or driver can discriminatively recognize the state in which abnormality occurs.

Furthermore, by providing the first and second sensor abnormality detecting means for setting the abnormal event storage device 133, the abnormal state relating to the throttle control can positively be detected, whereby the throttle control which plays an important role in securing the safety for the operation of the motor vehicle can be stopped.

In addition, by providing the earlier-half control abnormality detecting module 331 and the latter-half control abnormality detecting module 332 for setting the abnormal event storage device 133, it is possible to check duplicatively the abnormality of arithmetic operations executed by the CPUs 111 and 121 as well as the abnormality of the various types of sensors and the throttle valve control motor 103 relating to the throttle control. Thus, abnormality in the actuators for the main machinery can be detected with high reliability.

Embodiment 2

In the foregoing description of the intake air quantity control system according to the first embodiment of the invention, no consideration is paid to the detail of the threshold value setting module 317 (see FIG. 4) which is designed for setting the threshold value of the rotation speed (rpm) of the engine. The threshold value for the rotation speed (rpm) of the engine may be set on the basis of the default restoration signal for setting the opening degree of the throttle valve by means of the default mechanism 208 (see FIG. 3) and the brake application detecting signal generated upon operation of the brake switch.

In the following, description will be made in detail of the operation of the threshold value setting module 317 for changeably setting the threshold value according to a second embodiment of the present invention.

In the intake air quantity control system according to the second embodiment of the invention, the ECU 100 (see FIG. 2) includes a default restoration confirming means while the threshold value setting module 317 incorporated in the main CPU 111 (see FIG. 4) includes an ordinary threshold value setting means and a minimum threshold value setting means.

The default restoration confirming means incorporated in the ECU 100 is designed to make decision as to whether or not the opening degree of the throttle valve is restored by means of the default mechanism 208 (see FIG. 3) on the basis of the detection signals outputted from the first throttle position sensor (TPS1) or second throttle position sensor (TPS2) contained in the first or second analogue sensor group 102*a* or 102*b*, to thereby output a default restoration signal upon restoration of the opening degree of the throttle valve to the default position.

The ordinary threshold value setting means incorporated in the threshold value setting module 317 serves to set an ordinary threshold value on the basis of the default restoration signal supplied from the default restoration confirming means and the brake application detecting signal originating in the brake switch and contained in the second on/off sensor group 101*b*, when the default position is restored or when the brake is not being operated.

On the other hand, the minimum threshold value setting means incorporated in the threshold value setting module 317 is designed to set a minimum threshold value smaller than the ordinary threshold value on the basis of the default restoration signal and the brake application detecting signal when the restored opening degree of the throttle valve is large and when the brake switch is on.

In this manner, the threshold value setting module 317 sets changeably the predetermined threshold value in response to the default restoration signal and the brake application detecting signal through cooperation with the ordinary threshold value setting means and the minimum threshold value setting means. By virtue of this feature, the performance of the siding operation can significantly be improved.

Next, referring to a flow chart shown in FIG. 8, description will be made of the threshold value setting operation performed by the intake air quantity control system according to the second embodiment of the present invention.

Figure 8:
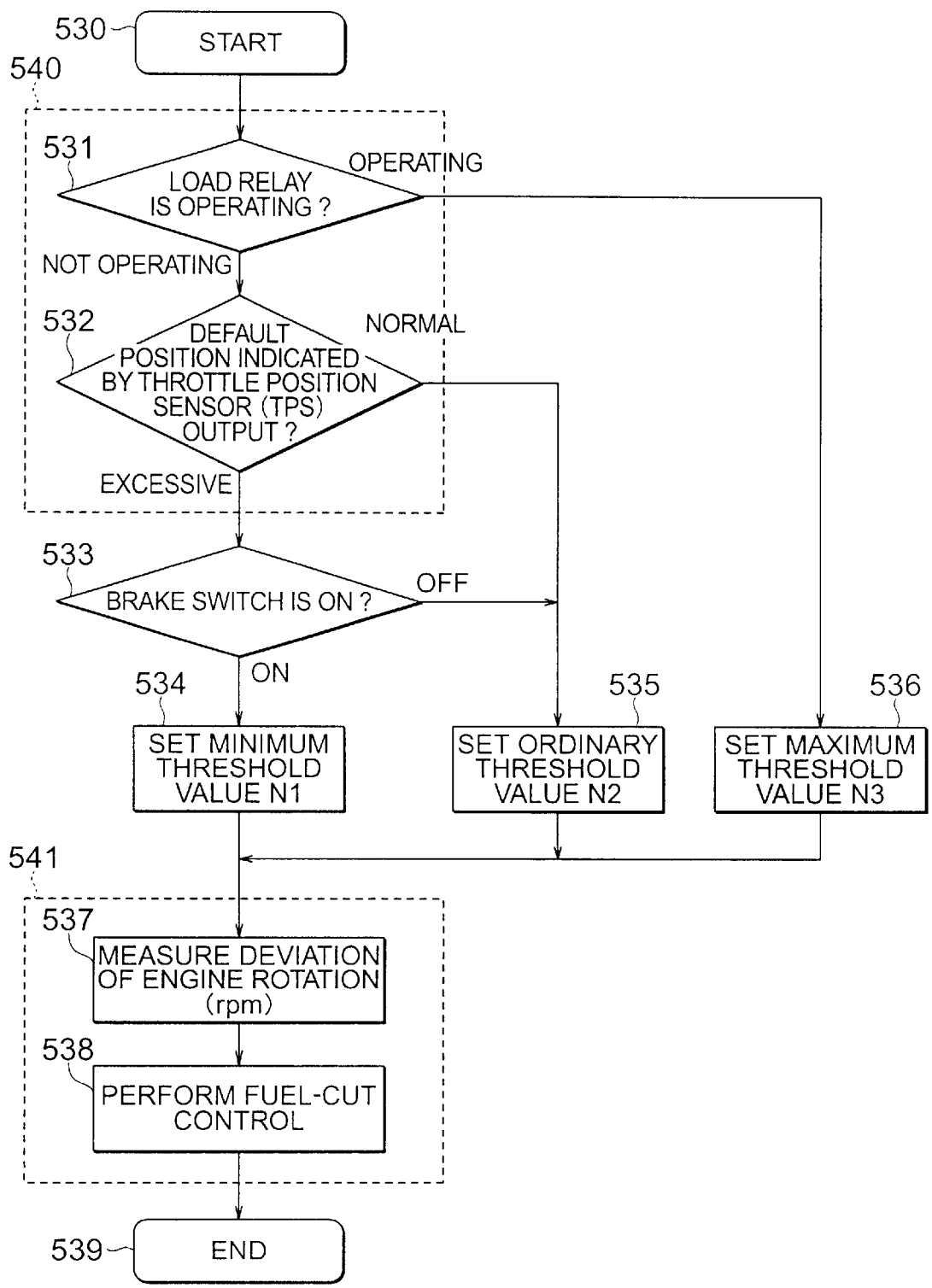
FIG. 8 is a flow chart for illustrating a threshold value setting operation procedure executed in the intake air quantity control system according to a second embodiment of the present invention.

The processing routine shown in FIG. 8 is activated periodically through interrupt operation (start step 530).

In succession, in a decision step 531, decision is made as to whether or not the load relay 104*a* is operating. When it is decided that the load relay 104*a* is not operating, decision is then made in a succeeding decision step 532 whether the output voltage of the first throttle position sensor (TPS1) or the second throttle position sensor (TPS2) indicates the value or level which corresponds to the default position of the throttle valve 200*b*.

In the step 532, it is decided whether or not the throttle valve 200*b* is fixedly locked to an excessively large open position due to a mechanical abnormality or the like.

When it is decided in the step 532 that the opening degree of the throttle valve is excessively large (e.g. in the fixedly locked state), decision is then made in a succeeding decision step 533 as to whether or not the brake pedal is depressed.

In the step 533, the depressed state of the brake pedal can be determined by checking whether the brake switch is in the on- or off-state.

When it is decided in the step 533 that the brake switch is in the on-state, this means that the load relay 104*a* is not operating (step 531), the open position of the throttle valve is excessively large (step 532) and that the brake switch is in the on-state (step 533). Accordingly, the processing proceeds to a minimum threshold value setting step 534.

In this conjunction, it is to be noted that when the load relay 104*a* is not in the operating state, the throttle valve 200*b* should intrinsically have been restored to the default position.

Nevertheless, if the throttle valve is in the locked state at the excessively large open position with the brake switch being in the on-state, the limit value of the rotation speed (rpm) of the engine is set to the minimum threshold value N1.

To the contrary, when it is decided in the step 532 that the opening degree of the throttle valve is normal (restored to the default position), this indicates that the throttle valve 200*b* has been restored to the default position with the load relay 104*a* being inoperative. Accordingly, the processing proceeds to an ordinary threshold value setting step 535, and thus the limit value of the engine rotation speed (rpm) is set to the ordinary threshold value N2.

By contrast, when it is decided in the step 533 that the brake switch is in the off-state, this indicates the state where the load relay 104*a* is inoperative with the opening degree of the throttle valve being excessively large while the brake pedal is being released. Accordingly, the processing proceeds to the step 535, whereon the limit value of the engine rotation speed (rpm) is set to the ordinary threshold value N2.

Furthermore, when it is decided in the step 531 that the load relay 104*a* is operative, then the processing proceeds to a maximum threshold value setting step 536, and thus the limit value of the engine rotation speed (rpm) is set to a maximum threshold value N3.

In the steps 534 to 536, the threshold values N1 to N3 may be set, for example, such that N1=1000 rpm, N2=1750 rpm and that N3=8000 rpm.

Subsequently, the engine rotation repressing control module 318 measures or detects the rotational deviation (difference) ΔN between any one of the threshold values N1, N2 and N3 and the detection value (indicating the actual rotation speed (rpm) of the engine) derived from the output of the engine rotation detecting sensor 304 (see FIG. 4).

In succession, the engine rotation repressing control module 318 drives the fuel injection solenoid valve 305 in dependence on the rotational deviation Δ N in a step 538 to perform the fuel-cut control so that the rotation speed (rpm) of the engine does not exceed the predetermined threshold value.

Subsequently, the processing proceeds to an end step 539, whereupon the processing routine shown in FIG. 8 comes to an end.

By the way, the processing step 540 (steps 531 and 532) indicated in phantom in FIG. 8 is executed by the default restoration confirming means, while the processing step 541 (steps 537 and 538) is executed by the engine rotation repressing control module 318.

By setting the threshold values N1 to N3 in the manner described above, the engine operation is performed within a range not exceeding the maximum engine rotation speed (rpm) permissible in view of the maximum threshold value N3 in the normal state where the load relay 104a is operating.

Further, when the load relay 104a becomes inoperative with the throttle valve 200b having normally been restored to the default position, the siding operation is performed at a speed not exceeding the engine rotation speed (rpm) limited by the ordinary threshold value N2. In this state, it is possible to stop the motor vehicle by overcoming the driving power of the engine by depressing powerfully the brake pedal.

However, in case the opening degree of the throttle valve is excessively large when the load relay 104a is inoperative, the motor vehicle can not easily be stopped even if the brake pedal is depressed vigorously so long as the ordinary threshold value N2 is being sustained alive. Accordingly, in this case, the ordinary threshold value N2 is charged over to the minimum threshold value N1 upon operation of the brake so that the motor vehicle can be stopped easily and smoothly.

As is apparent from the above, when the load relay 104a is electrically deenergized due to occurrence of abnormality, the throttle valve 200b is restored to the default position to thereby allow the siding operation to be performed with safety through brake applying operation. Additionally, even when the throttle valve should stick to the excessively large opening position due to a mechanical abnormality, the motor vehicle can be stopped without difficulty through the brake applying operation. In this way, the siding operation of the motor vehicle can be realized without difficulty.

In the foregoing description of the intake air quantity control system according to the second embodiment of the invention, it has been presumed that the main CPU 111 incorporates therein the engine rotation repressing control module 318, the default restoration confirming means and the threshold value setting module 317 including the ordinary threshold value setting means and the minimum threshold value setting means. However, it should be appreciated that at least one of the means mentioned above may be provided internally of the subsidiary CPU 121.

It should further be understood that so long as the intake air quantity control system for the engine is equipped with the default position restoring mechanism for causing the opening degree of the throttle valve to be automatically restored to the position corresponding to the opening degree which is slightly larger than that in the idle operation mode when the power supply to the throttle valve control motor 103 is broken (i.e., when the power supply to the load relay 104a is broken), fail-safe control can be ensured even upon occurrence of abnormality in the default position restoring operation without being restricted to the arrangement described hereinbefore by reference to FIGS. 1 and 2. Thus, the aimed control can be realized with high performance while enjoying enhanced fail-safe feature.

Further, it should also be mentioned that various modifications can be adopted in respect to the signal transfer performed between the main CPU 111 and the subsidiary CPU 121. By way of example, the signal to be handled only by the main CPU 111 need not be caused to pass through the subsidiary CPU 121 even if the signal is the sensor signal indicative of low-speed/low-frequency operation which gives rise to no problem as to the response performance.

Besides, the control for the peripheral auxiliary equipments 105b which can be realized with only the subsidiary CPU 121 can be executed without positively taking into consideration the CPU 111.

Further, the number of shift stages for the speed stage shifting solenoid valve which is one of the peripheral auxiliary equipments 105b may be determined primarily as a function of the depression degree of the accelerator pedal 210a and the speed of the motor vehicle.

The control signal for the transmission-dedicated solenoid valve may be delivered directly from the main CPU 111.

Furthermore, although description has been made on the presumption that the subsidiary CPU 121 primarily performs the abnormality detection control, some abnormality detection control may be executed by the main CPU 111.

In brief, an important feature of the present invention is found in that the ignition control, the fuel injection control and the throttle control which bear very close relevancy to the engine rotation control are executed unitary or uniformly by the main CPU 111, as shown in FIG. 2. Incidentally, in the case of the Diesel engine, the ignition control is unnecessary, needless to say.

Moreover, for the sensor input/output signals indicative of low-speed/low-frequency operations which present practically no problems even when response delay is involved in the transaction through the medium of the serial interfaces 117 and 127, arrangement may be made such that as many of these sensor input/output signals as possible can be handled by the subsidiary CPU 121 so that it can execute various abnormality detections except for those relevant to the throttle control. In this manner, the burden for control imposed on the main CPU 111 can remarkably be mitigated, to a great advantage.

For detecting abnormality in the communication between the serial interfaces 117 and 127, it is sufficient for these CPUs to check mutually the time taken for the communication in response from the counterpart.

By way of example, such arrangement may be adopted that when a time-out error should occur in the subsidiary CPU 121, then the reset signal RST2 is generated by the main CPU 111 to thereby reactivate the subsidiary CPU 121 for putting into operation the abnormal event storage device 133.

On the other hand, when a time-out error should occur in the main CPU 111, then the error signal ER is generated by the subsidiary CPU 121 to thereby trigger the operation of the abnormal event storage device 133.

Many modifications and variations of the present invention are possible in the light of the above techniques. It is therefore to be understood that within the scope of the appended claims, the invention may be practiced otherwise than as specifically described.

What is claimed is:

1. An intake air quantity control system for an internal combustion engine, comprising:

a controller which regulates a quantity of intake air supplied to said internal combustion engine;

engine driving machinery of said internal combustion engine;

a load relay through which an electric power is supplied to said controller;

peripheral auxiliary equipment of said internal combustion engine;

a main CPU which receives at least one signal from sensors monitoring high-speed/high-frequency operations, and supplies a first control signal to said controller and a second control signal to said engine driving machinery; and a subsidiary CPU which receives at least one signal from sensors monitoring low-speed/low-frequency operations, and supplies a load relay driving signal to said load relay and a third control signal to said peripheral auxiliary equipment through cooperation with said main CPU.

2. An intake air quality control system as claimed in claim 1, further comprising:
   a first group of on/off sensors for supplying to said main CPU a first group of on/off signals for said high-speed/high-frequency operations related to said first and second control signals;
   a first group of analogue sensors for supplying a first group of analogue signals to said main CPU;
   a second group of on/off sensors for supplying to said subsidiary CPU a second group of on/off signals for said low-speed/low-frequency operations related to at least one of said first, second and third control signals; and
   a second group of analogue sensors for supplying a second group of analogue signals to said subsidiary CPU.

3. An intake air quality control system as claimed in claim 1, further comprising a serial interface for signal transfer between said main CPU and said subsidiary CPU.

4. An intake air quality control system as claimed in claim 1, further comprising:
   an alarm display device;
   an abnormal event storing device for storing detection of an abnormal event to thereby electrically deenergize said load relay while electrically energizing said alarm display device;
   a power switch for supplying an electric power to at least one of said main CPU and said subsidiary CPU; and
   power supply detecting means operative in response to closing or opening of said power switch,
   wherein said abnormal event storing device is reset by said power supply detecting means.

5. An intake air quality control system as claimed in claim 1, wherein said controller comprises a throttle valve control motor for controlling an opening degree of a throttle valve for thereby adjustably regulating said quantity of intake air supplied to said internal combustion engine in dependence on a depression degree of an accelerator pedal.

6. An intake air quality control system as claimed in claim 1, wherein said engine driving machinery comprises a fuel injection solenoid valve.

7. An intake air quantity control system for an internal combustion engine, comprising:
   a throttle valve control motor for controlling an opening degree of a throttle valve for thereby adjustably regulating a quantity of intake air supplied to said internal combustion engine in dependence on a depression degree of an accelerator pedal;
   engine driving machinery including an fuel injection solenoid valve of said internal combustion engine;
   a load relay through which an electric power is supplied to said throttle valve control motor;
   peripheral auxiliary equipments of said internal combustion engine;
   an alarm display device;
   a main CPU for supplying a first control signal to said throttle valve control motor and second control signals to said engine driving machinery;
   a subsidiary CPU for supplying a load relay driving signal to said load relay and third control signals to said peripheral auxiliary equipments through cooperation with said main CPU;
   a first group of on/off sensors for supplying to said main CPU a first group of on/off signals for high-speed/high-frequency operations having relevancy to said first and second control signals;
   a first group of analogue sensors for supplying a first group of analogue signals to said main CPU;
   a second group of on/off sensors for supplying to said subsidiary CPU a second group of on/off signals for low-speed/low-frequency operations having relevancy to at least one of said first, second and third control signals;
   a second group of analogue sensors for supplying a second group of analogue signals to said subsidiary CPU;
   serial interface means for enabling signals to be transferred between said main CPU and said subsidiary CPU;
   an abnormal event storing device for storing detection of an abnormal event to thereby electrically deenergize said load relay while electrically energizing said alarm display device;
   a power switch for supplying an electric power to at least one of said main CPU and said subsidiary CPU; and
   power supply detecting means operative in response to closing or opening of said power switch,
   wherein said abnormal event storing device is reset by said power supply detecting means.

8. An intake air quantity control system for an internal combustion engine according to claim 1,
   wherein said first group of analogue sensors includes:
      a first accelerator pedal position sensor for detecting the depression degree of said accelerator pedal; and
      a first throttle position sensor for detecting the opening degree of said throttle valve,
   wherein said second group of analogue sensors includes:
      a second accelerator pedal position sensor for detecting the depression degree of said accelerator pedal; and
      a second throttle position sensor for detecting the opening degree of said throttle valve, and
      wherein signals indicative of said depression degree of said accelerator pedal and said opening degree of said throttle valve are, respectively, inputted to said main CPU and said subsidiary CPU.

9. An intake air quantity control system for an internal combustion engine according to claim 2,
   further comprising:
      first sensor abnormality detecting means for generating a first sensor abnormality detection signal in response to occurrence of the wire-breakage/short-circuit abnormality of said first and second accelerator pedal position sensors and relative output abnormality thereof; and
      second sensor abnormality detecting means for generating a second sensor abnormality detection signal in response to occurrence of the wire-breakage/short-circuit abnormality of said first and second throttle position sensors and relative output abnormality thereof,
      wherein said abnormal event storage device is set in response to said first and second abnormality detection signals.

10. An intake air quantity control system for an internal combustion engine according to claim 1,
    further comprising:
       wire-breakage/short-circuit detecting means for detecting occurrence of wire-breakage/short-circuit abnormality in said throttle valve control motor to thereby generate a wire-breakage/short-circuit abnormality detection signal; and a watchdog timer circuit for monitoring runaway of said main CPU on the basis of a watchdog signal generated by said main CPU;

wherein said watchdog timer circuit is so designed as to generate a first reset signal for reactivating said main CPU upon occurrence of abnormality in said watchdog signal generated by said main CPU, wherein said main CPU is so designed as to generate a second reset signal for reactivating said subsidiary CPU upon occurrence of abnormality in a watchdog signal generated by said subsidiary CPU, and wherein said abnormal event storage device is set in response to said wire-breakage/short-circuit abnormality detection signal and said first and second reset signals.

11. An intake air quantity control system for an internal combustion engine according to claim 1, wherein at least one of said first and second groups of analogue sensors includes a throttle position sensor for detecting said opening degree of said throttle valve, said main CPU being designed to arithmetically determine a first target throttle opening degree as a target value for said opening degree of said throttle valve, and said subsidiary CPU being designed to arithmetically determine a second target throttle opening degree as a target value for said opening degree of said throttle valve, wherein said subsidiary CPU including:
earlier-half control abnormality detecting means for deciding validity of said first target throttle opening degree through comparison of a signal indicative of said first target throttle opening degree with a signal indicative of said second target throttle opening degree; and latter-half control abnormality detecting means for deciding the validity of said first target throttle opening degree through comparison of said signal indicative of said first target throttle opening degree with a detection signal outputted from said second throttle position sensor and inputted to said subsidiary CPU, wherein said abnormal event storage device is set in response to an earlier-half abnormality detection signal generated by said earlier-half control abnormality detecting means and a latter-half abnormality detection signal generated by said latter-half control abnormality detecting means.

12. An intake air quantity control system for an internal combustion engine according to claim 1, at least one of said first and second groups of analogue sensors including a throttle position sensor for detecting said opening degree of said throttle valve, further comprising:
a brake switch for detecting a depressed state of a brake pedal to thereby generate a brake application detecting signal;

a default position restoring mechanism for causing the throttle valve to be automatically restored to a position at which the opening degree of said throttle valve is slightly greater than that in an idle operation mode of said internal combustion engine, when the power supply to said throttle valve control motor is interrupted;

engine rotation repressing means for adjustably regulating a fuel quantity supplied through said fuel injection solenoid valve in response to deviation of an actual rotation speed of said internal combustion engine from a predetermined threshold value of the rotation speed of said engine upon electrical deenergization of said load relay;

default restoration confirming means responsive to a detection signal of said throttle position sensor for deciding whether said opening degree of the throttle valve is restored to a predetermined position to thereby generate a default restoration signal;

ordinary threshold value setting means for setting an ordinary threshold value on the basis of said default restoration signal and said brake application detecting signal when said default position is restored or alternatively when the brake is inoperative; and minimum threshold value setting means for setting a minimum threshold value on the basis of said default restoration signal and said brake application detecting signal when the opening degree of said throttle valve is large in the state restored to said default position and when said brake switch is operative, wherein said predetermined threshold value is variably set by said ordinary threshold value setting means and said minimum threshold value setting means in response to said default restoration signal and said brake application detecting signal.

13. An intake air quantity control system for an internal combustion engine, comprising:

a throttle valve control motor for controlling an opening degree of a throttle valve for thereby adjustably regulating a quantity of intake air supplied to said internal combustion engine in dependence on a depression degree of an accelerator pedal;

a load relay for supplying an electric power to said throttle valve control motor;

an accelerator pedal position sensor for detecting said depression degree of said accelerator pedal;

a throttle position sensor for detecting said opening degree of said throttle valve, a brake switch for detecting a depressed state of a brake pedal to thereby generate a brake application detecting signal;

a default position restoring mechanism for causing said throttle valve to be automatically restored to a position at which the opening degree of said throttle valve is slightly greater than that in an idle operation mode of said internal combustion engine, when the power supply to said throttle valve control motor is interrupted;

engine rotation repressing means for adjustably regulating a fuel quantity supplied through said fuel injection solenoid valve in response to deviation of an actual rotation speed of said internal combustion engine from a predetermined threshold value of the rotation speed of said engine upon deenergization of said load relay;

default restoration confirming means responsive to a detection signal of said throttle position sensor for deciding whether said opening degree of the throttle valve is restored to a predetermined position to thereby generate a default restoration signal;

ordinary threshold value setting means for setting an ordinary threshold value on the basis of said default restoration signal and said brake application detecting signal when said default position is restored or alternatively when the brake is inoperative; and minimum threshold value setting means for setting a minimum threshold value on the basis of said default restoration signal and said brake application detecting signal when the opening degree of said throttle valve is large in the state restored to said default position and when said brake switch is operative, wherein said predetermined threshold value is variably set by said ordinary threshold value setting means and said minimum threshold value setting means in response to said default restoration signal and said brake application detecting signal.

14. A method for controlling intake air quantity for an internal combustion engine, said method comprising:

controlling an opening degree of a throttle valve for thereby adjustably regulating a quantity of intake air supplied to said internal combustion engine in dependence on a depression degree of an accelerator pedal;

supplying an electric power to a throttle valve control motor which controls said opening degree of said throttle valve;

detecting said depression degree of said accelerator pedal;

detecting said opening degree of said throttle valve, detecting a depressed state of a brake pedal to thereby generate a brake application detecting signal;

automatically restoring said throttle valve to a position at which the opening degree of said throttle valve is slightly greater than that in an idle operation mode of said internal combustion engine, when the power supply to said throttle valve control motor is interrupted;

adjustably regulating a fuel quantity supplied through a fuel injection solenoid valve in response to deviation of an actual rotation speed of said internal combustion engine from a predetermined threshold value of the rotation speed of said engine upon deenergization of a load relay which supplies said electric power to said throttle valve control motor;

deciding, in response to said detecting of said opening degree of said throttle valve, whether said opening degree of the throttle valve is restored to a predetermined position to thereby generate a default restoration signal;

setting an ordinary threshold value on the basis of said default restoration signal and said brake application detecting signal when said default position is restored or alternatively when the brake is inoperative; and minimum threshold value setting means for setting a minimum threshold value on the basis of said default restoration signal and said brake application detecting signal when the opening degree of said throttle valve is large in the state restored to said default position and when said brake switch is operative, wherein said predetermined threshold value is variably set in response to said default restoration signal and said brake application detecting signal.

* * * * *